United States Patent
Kobayashi et al.

(10) Patent No.: US 8,466,869 B2
(45) Date of Patent: Jun. 18, 2013

(54) DISPLAY APPARATUS THAT CONTROLS A LENGTH OF AN EMISSION PERIOD OR LUMINANCE OF A DISPLAY AREA ACCORDING TO TEMPERATURE OF A LIQUID CRYSTAL PANEL

(75) Inventors: Takahiro Kobayashi, Osaka (JP); Yoshio Umeda, Hyogo (JP); Seiji Hamada, Osaka (JP); Tatsuya Ina, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/314,667

(22) Filed: Dec. 8, 2011

(65) Prior Publication Data

US 2012/0081624 A1   Apr. 5, 2012

Related U.S. Application Data

(63) Continuation of application No. PCT/JP2011/002688, filed on May 13, 2011.

(30) Foreign Application Priority Data

May 13, 2010   (JP) .................. 2010-111115

(51) Int. Cl.
*G09G 3/36* (2006.01)
(52) U.S. Cl.
USPC .............. 345/102; 345/84; 345/691; 348/56; 349/15
(58) Field of Classification Search
USPC ............. 345/87–104, 56, 6; 348/42; 349/15
See application file for complete search history.

(56) References Cited

U.S. PATENT DOCUMENTS

| | | | | |
|---|---|---|---|---|
| 7,990,360 B2 * | 8/2011 | Song et al. | | 345/102 |
| 8,044,881 B2 | 10/2011 | Nam et al. | | |
| 2007/0091058 A1 | 4/2007 | Nam et al. | | |
| 2008/0238839 A1 * | 10/2008 | Kim et al. | | 345/83 |
| 2010/0060723 A1 | 3/2010 | Kimura et al. | | |
| 2010/0188399 A1 * | 7/2010 | Shestak et al. | | 345/419 |
| 2011/0149053 A1 | 6/2011 | Ito et al. | | |
| 2011/0157332 A1 * | 6/2011 | Kim et al. | | 348/56 |

FOREIGN PATENT DOCUMENTS

| | | |
|---|---|---|
| JP | 62-133891 | 6/1987 |
| JP | 2001-154640 | 6/2001 |

(Continued)

OTHER PUBLICATIONS

International Search Report issued Aug. 2, 2011 in International (PCT) Application No. PCT/JP2011/002688.

*Primary Examiner* — Amare Mengistu
*Assistant Examiner* — Gloryvid Figueroa-Gibson
(74) *Attorney, Agent, or Firm* — Wenderoth, Lind & Ponack, L.L.P.

(57) ABSTRACT

A display apparatus including: a liquid crystal panel for displaying left and right images; a liquid crystal driver for writing an image signal into the liquid crystal panel; a backlight source for radiating light to the liquid crystal panel; and a controller for controlling the backlight source so that it emits the light during first emission periods which are set for a left viewing periods while a left image is viewed with a left eye and right viewing periods while a right image is viewed with a right eye, respectively, wherein the controller controls the backlight source so that it emits the light during a second emission period within a non-viewing period, during which no image is viewed, and sets a turn-off period during which the backlight source is turned off between the first and second emission periods.

2 Claims, 14 Drawing Sheets

FOREIGN PATENT DOCUMENTS

| | | |
|---|---|---|
| JP | 2002-365611 | 12/2002 |
| JP | 2007-114793 | 5/2007 |
| JP | 2008-249876 | 10/2008 |
| JP | 2009-25436 | 2/2009 |
| JP | 2011-128548 | 6/2011 |
| WO | 2008/056753 | 5/2008 |

* cited by examiner

FIG. 2
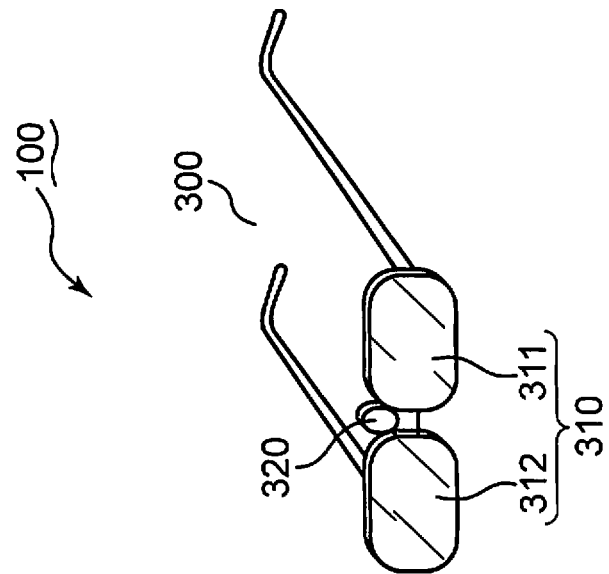
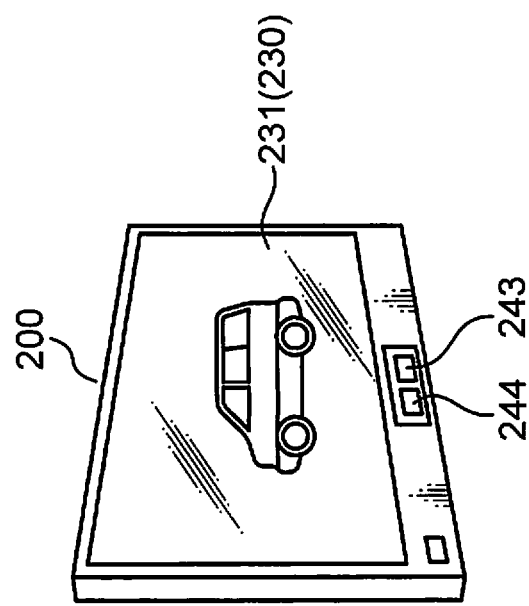

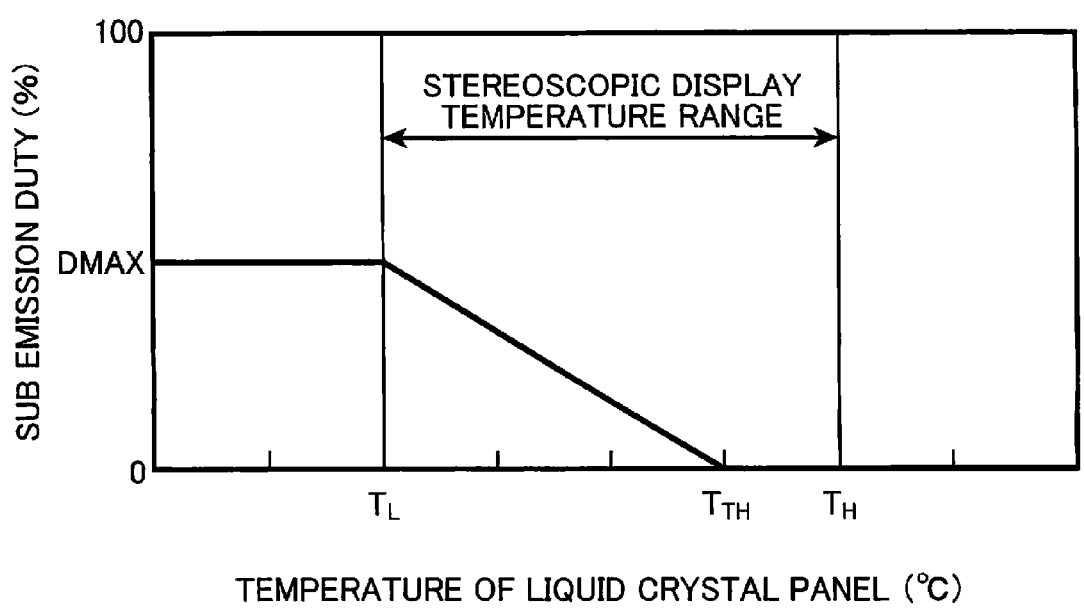

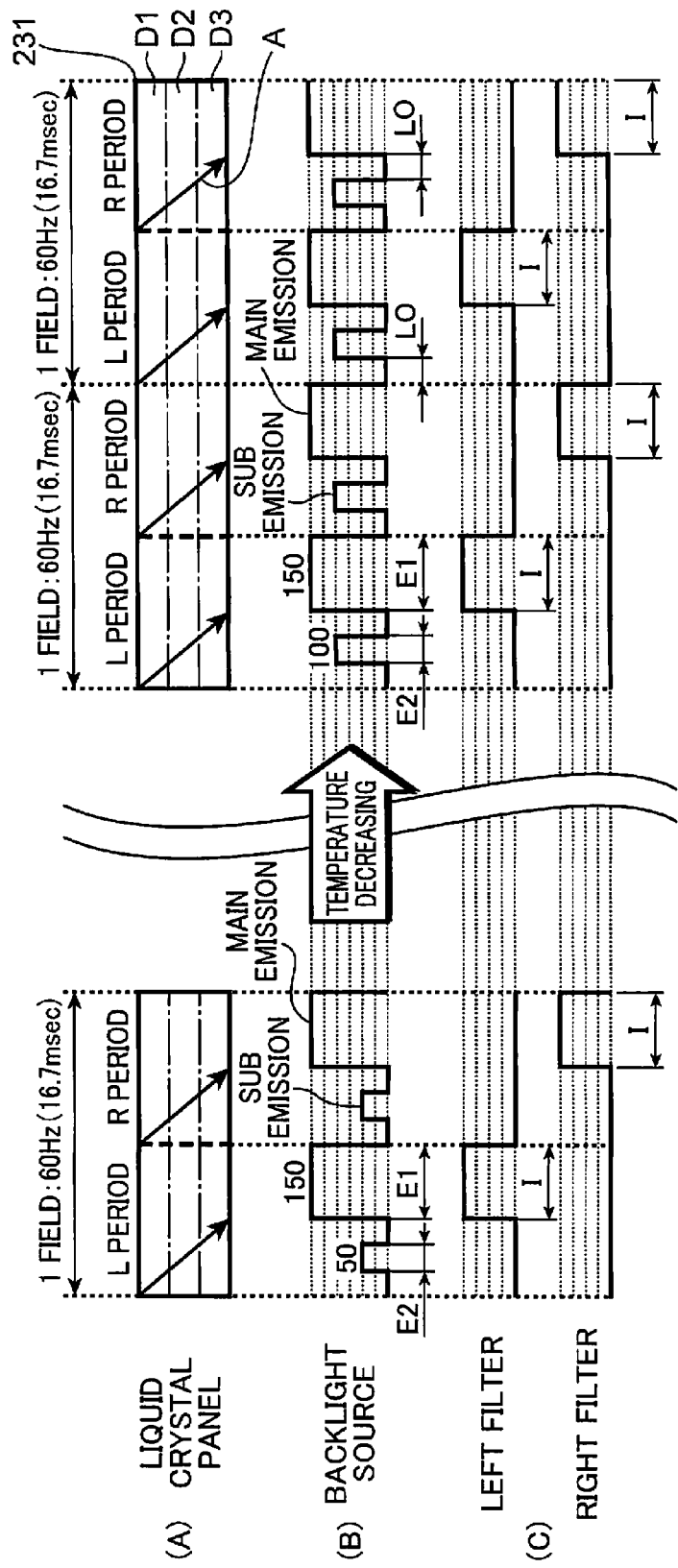

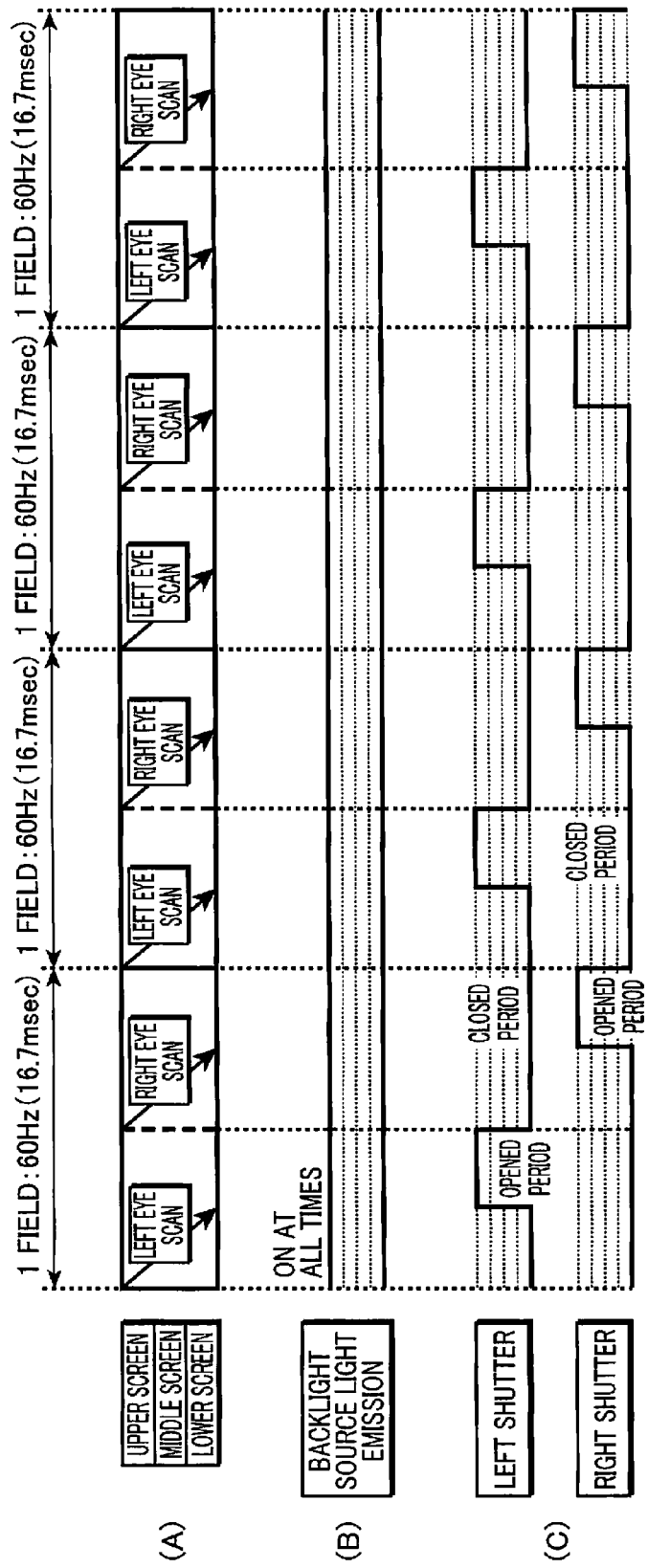

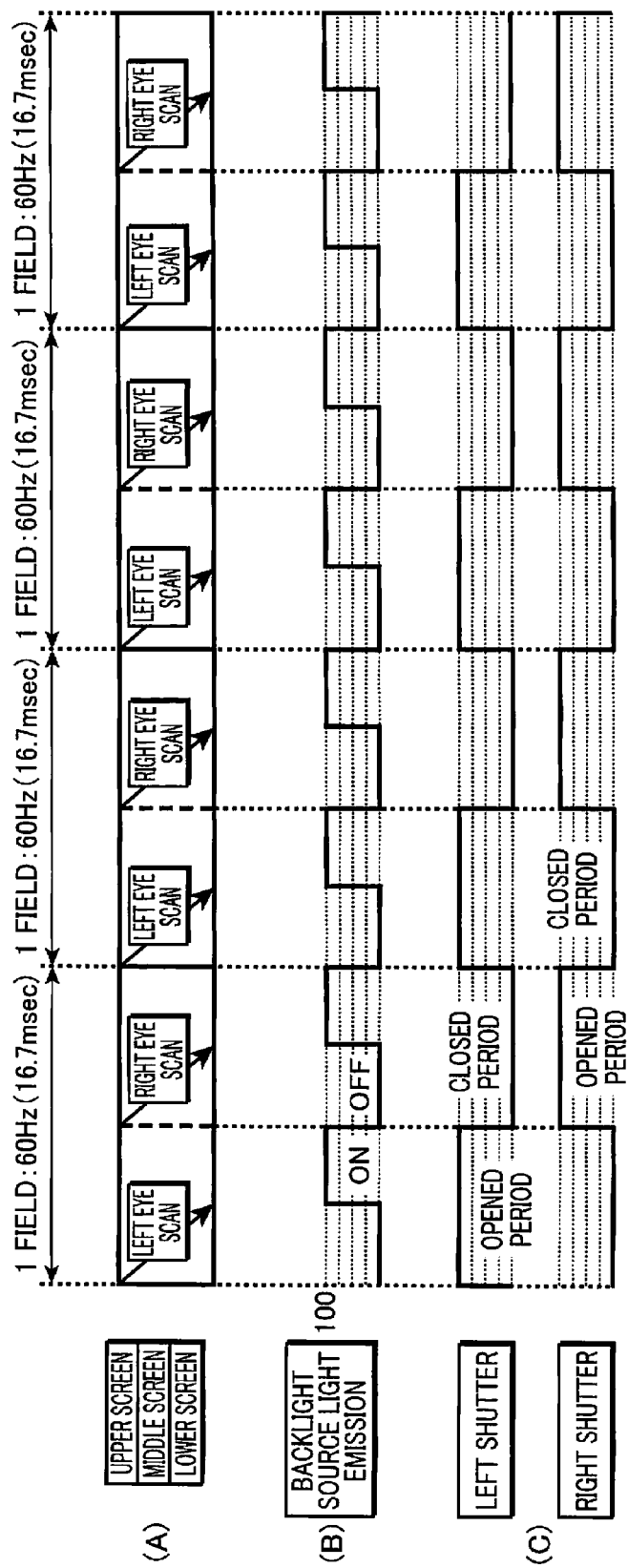

DISPLAY APPARATUS THAT CONTROLS A LENGTH OF AN EMISSION PERIOD OR LUMINANCE OF A DISPLAY AREA ACCORDING TO TEMPERATURE OF A LIQUID CRYSTAL PANEL

This application is a Continuation of International Application No. PCT/JP2011/002688,with the International Filing Date of May 13, 2011.

TECHNICAL FIELD

The present invention is related to a display apparatus for displaying an image, which is stereoscopically perceived, and an image viewing system for allowing a viewer to view the image displayed by the display apparatus.

BACKGROUND OF THE INVENTION

A display apparatus configured to display an image, which is stereoscopically perceived, alternately shows a left image for a left eye and a right image for a right eye in a given cycle (e.g., a field cycle). The displayed left and right images contain different contents from each other by parallax. A viewer views the left and right images by means of an eyeglass device, which has liquid-crystal shutters driven in synchronism with the display cycle of the left and right images (cf., Patent Documents 1 and 2). As a result, the viewer may perceive a stereoscopic object depicted in the left and right images.

FIG. 12 is a block diagram of a conventional image viewing system. The image viewing system shown in FIG. 12 receives an input of a 60-Hz image signal (left and right image signals).

An image viewing system 900 comprises an image signal processor 901 configured to receive an input of a 60-Hz image signal (left and right image signals). The image signal processor 901 converts the input image signal into 120-Hz left and right image signals. The left and right image signals obtained as a result of the conversion are output to a liquid crystal driver 902 and a backlight source controller 903. The liquid crystal driver 902 converts the 120-Hz left and right image signals according to a display format of a liquid crystal panel 904. The left and right image signals converted by the liquid crystal driver 902 are output to the liquid crystal panel 904. The backlight source controller 903 outputs an emission control signal to a backlight source 905. The backlight source 905 emits light to the liquid crystal panel 904 from its back surface in response to the emission control signal. Therefore, left and right images are alternately displayed at 120 Hz on the liquid crystal panel 904.

An eyeglass device 950 has a left shutter 951 and a right shutter 952. A shutter control circuit 906 for the left shutter 951 and a shutter control circuit 907 for the right shutter 952 synchronously control the left and right shutters 951, 952 in response to the 120-Hz left and right image signals converted by the image signal processor 901.

FIG. 13 is a control timing chart of the conventional image viewing system 900. Section (A) of FIG. 13 shows scan timing for scanning the left and right images on the liquid crystal panel 904. Section (B) of FIG. 13 shows timing for brightening the backlight source 905. Section (C) of FIG. 13 shows timing for opening/closing the shutters 951, 952 of the eyeglass device 950. The conventional image viewing system 900 is described with reference to FIGS. 12 and 13.

The left and right image signals are sequentially written into the liquid crystal panel 904. Meanwhile, the backlight source 905 is brightened all the time. The shutter control circuits 906, 907 control the shutters 951, 952. After the right-and-left alternate write-scanning on the liquid crystal panel 904, the shutters 951, 952 are opened/closed under the control of the shutter control circuits 906, 907 so that an open period of each shutter becomes half of each image period. The left and right images are viewed with the right and left eyes of the viewer through the shutters 951, 952. Therefore, the viewer may create a visually stereoscopic image in the brain.

In the image viewing system, which is operated under the control timing shown in FIG. 13, the viewer views only one of the left and right images while one of the shutters 951, 952 are opened (an image viewing period long enough to create a stereoscopic image). On the other hand, the backlight source 905 is brightened all the times even in another period than the opening periods of the shutters 951, 952. Therefore, the image viewing system, which is operated under the control timing shown in FIG. 13, is not preferable in terms of saving electricity.

FIG. 14 is another control timing chart of the conventional image viewing system 900. Section (A) of FIG. 14 shows scan timing for scanning the left and right images on the liquid crystal panel 904. Section (B) of FIG. 14 shows timing for brightening the backlight source 905. Section (C) of FIG. 14 shows timing for opening/closing the shutters 951, 952 of the eyeglass device 950. The conventional image viewing system 900 is further described with reference to FIGS. 12 to 14.

Patent Document 2 discloses control to turn on the backlight source 905 only while the left or right image is viewed. Unlike the control shown in FIG. 13, under the control shown in FIG. 14, the backlight source 905 emits the light only while the left or right image is viewed. Therefore, the control shown in FIG. 14 is better than the control shown in FIG. 13 in terms of saving electricity.

The image viewing system shown in FIG. 14 has the following problems. The fact that the backlight source 905 is turned on only while the left or right image is viewed means a shortened lighting period to turn on the backlight source 905. A temperature of the liquid crystal panel goes down under the shortened lighting period of the backlight source 905. The decrease in temperature of the liquid crystal panel 904 reduces a response speed of the liquid crystal panel 904.

If the response speed of the liquid crystal panel 904 goes down, for example, the left image may be still partially displayed on the liquid crystal panel 904 even after completion of the right image scanning because of a delayed response of liquid crystal. As a result, image light from the left image travels through the right shutter and reaches the right eye of the viewer. Likewise, the image light from a part of the right image, which is still displayed after completion of the left image scanning, travels through the left shutter and reaches the left eye of the viewer. The left image viewed with the right eye and/or the right image viewed with the left eye are obstruction images called "crosstalk", which interferes with the creation of the visually stereoscopic image in the brain of the viewer.

Patent Document 1: JP 62-133891 A
Patent Document 2: JP 2009-25436 A

DISCLOSURE OF THE INVENTION

An object of the present invention is to provide a display apparatus and an image viewing system, which may moderate the crosstalk between left and right images.

A display apparatus according to one aspect of the present invention includes: a liquid crystal panel configured to temporally and alternately switch over and display a left image which is viewed with a left eye and a right image which is viewed with a right eye; a liquid crystal driver configured to write an image signal into the liquid crystal panel, the image signal including a left image signal to create the left image and a right image signal to create the right image; a backlight source configured to radiate light to the liquid crystal panel; and a controller configured to control the backlight source so that the backlight source emits the light during first emission periods which are set for a left viewing period while the left image is viewed with the left eye and a right viewing period while the right image is viewed with the right eye, respectively, wherein the controller controls the backlight source so that the backlight source emits the light during a second emission period within a non-viewing period, during which none of the left and right images is viewed, and sets a turn-off period during which the backlight source is turned off between the first and second emission periods.

An image viewing system according to another aspect of the present invention includes: a display apparatus configured to temporally switch over and display a left image and a right image; and an eyeglass device which includes a left filter configured to adjust a light amount reaching the left eye and a right filter configured to adjust a light amount reaching the right eye, wherein the display apparatus includes: a liquid crystal panel configured to temporally switch over and alternately switch over and display the left and right images; a liquid crystal driver configured to write an image signal into the liquid crystal panel, the image signal including a left image signal to create the left image and a right image signal to create the right image; a backlight source configured to radiate light to the liquid crystal panel; and a controller configured to control the backlight source so that the backlight source emits the light during first emission periods which are set for a left viewing period while the left image is viewed with the left eye and a right viewing period while the right image is viewed with the right eye, respectively; and wherein the left filter increases the light amount reaching the left eye in the left viewing period under control of the controller, the right filter increases the light amount reaching the right eye in the right viewing period under the control of the controller, and the controller controls the backlight source so that the backlight source emits the light during a second emission period within a non-viewing period, during which none of the left and right images is viewed, and sets a turn-off period during which the backlight source is turned off between the first and second emission periods.

BRIEF DESCRIPTION OF THE DRAWINGS

FIG. 2 is a schematic view of the image viewing system shown in FIG. 1.

FIG. 6 is a graph depicting a relationship between a temperature of a liquid crystal panel used in the control of the image viewing system shown in FIG. 5, and a second emission period set in correspondence with the temperature of the liquid crystal panel.

FIG. 8 is a schematic control timing chart showing control of an image viewing system according to the third embodiment.

FIG. 13 is a control timing chart depicting control of the conventional image viewing system.

FIG. 14 is a control timing chart depicting another control of the conventional image viewing system.

DETAILED DESCRIPTION OF THE INVENTION

Figure 1:
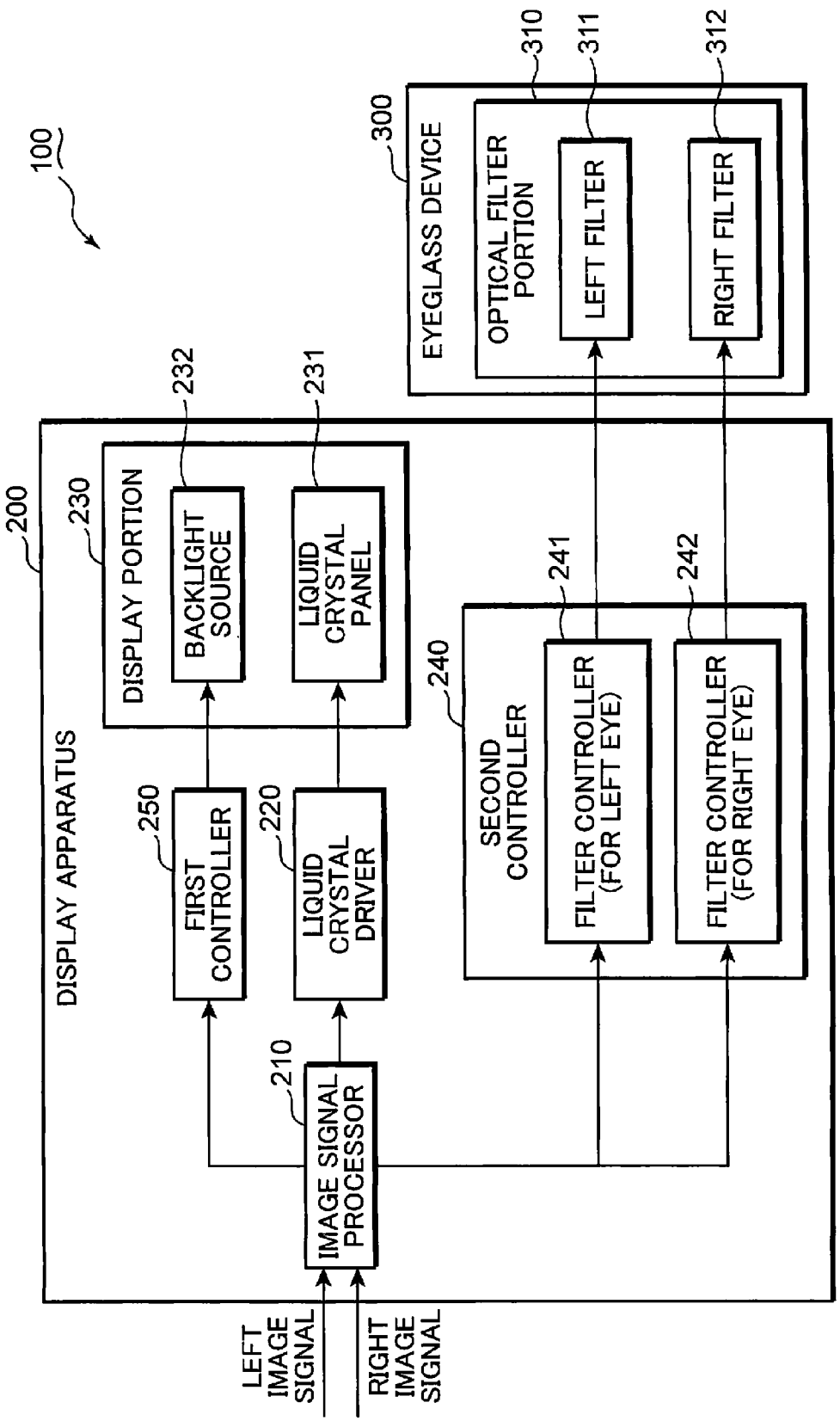
FIG. 1 is a schematic block diagram showing a configuration of an image viewing system according to the first embodiment.

A display apparatus and image viewing system according to various embodiments are described hereinafter with reference to the accompanying drawings. The same reference numerals are used for describing the same components in the following embodiments. Redundant descriptions thereof are omitted for the purpose of clarification. The purpose of configurations, arrangements or shapes shown in the drawings as well as the descriptions related to the drawings, are simply for facilitating to make principles of the embodiments understood, and the principles of the embodiments are not limited thereto.

<First Embodiment>
(Configuration of Image Viewing System)

FIG. 1 is a block diagram schematically showing a configuration of an image viewing system according to the first embodiment. FIG. 2 is a schematic view of the image viewing system shown in FIG. 1. The configuration of the image viewing system is described with reference to FIGS. 1 and 2.

An image viewing system 100 comprises a display apparatus 200 configured to display a left image in response to a left image signal viewed with the left eye (referred to as "L signal" hereinafter), and a right image in response to a right image signal viewed with a right eye (referred to as "R signal" hereinafter), and an eyeglass device 300 which assists in viewing the images displayed by the display apparatus 200. A viewer uses the eyeglass device 300 to stereoscopically perceive the images displayed by the display apparatus 200.

The eyeglass device 300, which looks like visual correction eyeglasses, has an optical filter portion 310 which includes a left filter 311 in front of the left eye of the viewer and a right filter 312 in front of the right eye of the viewer. The left and right filters 311, 312 include optical elements for adjusting a light amount reaching the left eye of the viewer (referred to as "left light amount" hereinafter) and a light amount reaching the right eye of the viewer (referred to as "right light amount" hereinafter), from the images displayed by the display apparatus 200. Shutter elements (e.g., liquid crystal shutters) for opening/closing optical paths which travels to the left and right eyes of the viewer, deflection elements (e.g., liquid crystal filters) for deflecting light which travels to the left and right eyes of the viewer, or other optical elements configured to adjust the light amount, are suitably used as the left and right filters 311, 312. The left filter 311 is controlled so as to increase the left light amount in synchronization with display of the left image, and to also reduce the left light amount in synchronization with display of the right image. Likewise, the right filter 312 is controlled so as to increase the right light amount in synchronism with display of the right image, and to also reduce the right light amount in synchronism with display of the left image.

The display apparatus 200 comprises an image signal processor 210, a liquid crystal driver 220, a display portion 230, a first controller 250, and a second controller 240.

The image signal processor 210 receives an input of an image signal (the left and right image signals) which has a vertical synchronization frequency to be used as a base to control the image viewing system. The image signal processor 210 divides the input image signal into an L signal and an R signal at a frequency, which is N times as high as the control-basis vertical synchronization frequency (N is a natural number). In the present embodiment, the input 60-Hz image signal is converted to 120-Hz L and R signals. The L and R signals obtained by the conversion are output to the liquid crystal driver 220. The image signal processor 210 outputs a control signal to the first controller 250 in synchronism with the output of the L and R signals. The first controller 250 controls a backlight source 232 of the display portion 230 in response to the control signal from the image signal processor 210. The image signal processor 210 outputs a control signal to control the second controller 240, in synchronism with the output of the L and R signals. The second controller 240 controls the optical filter portion 310 in response to the control signal from the image signal processor 210. The control signal output to the first and/or second controllers 250, 240 may be the L and/or R signals themselves converted by the image signal processor 210. Alternatively, the control signal output to the first and/or second controllers 250, 240 may be a 120-Hz synchronization signal, which synchronizes with the output of the L and/or R signals. In the present embodiment, the first and/or second controllers 250, 240 are exemplified as the controller.

The display portion 230 comprises a liquid crystal panel 231 configured to temporally and alternately switch over and display the left and right images, which are viewed with the left and right eyes, respectively, and the backlight source 232 which radiates light to the liquid crystal panel 231. The liquid crystal driver 220 converts the 120-Hz L and R signals into a display format of the liquid crystal panel 231. The liquid crystal driver 220 writes the converted L and R signals into the liquid crystal panel 231.

The liquid crystal panel 231 modulates the light entering from its back surface, in response to the input L and R signals, and sequentially displays the left and right images, which are viewed with the left and right eyes, respectively. For example, various driving systems such as an IPS (In Plane Switching) system, a VA (Vertical Alignment) system, and a TN (Twisted Nematic) system are suitably applied to the liquid crystal panel 231.

The backlight source 232 radiates the light from the back surface toward a display surface of the liquid crystal panel 231. In the present embodiment, several light-emitting diodes (LED) (not shown), which are two-dimensionally arrayed for surface-emission, are used as the backlight source 232. Alternatively, several fluorescent tubes which are arrayed for the surface-emission may be used as the backlight source 232. The light-emitting diodes or the fluorescent tubes used as the backlight source 232 may be disposed at an edge of the liquid crystal panel 231 for the surface emission (edge type).

The first controller 250 outputs an emission control signal in response to the 120-Hz control signal, which is output from the image signal processor 210. The backlight source 232 blinks in response to the emission control signal.

The second controller 240 controls the optical filter portion 310 of the eyeglass device 300 in accordance with the display cycle of the left and right images. The second controller 240 includes a left filter controller 241 (referred to as "L filter controller 241" hereinafter) configured to control the left filter 311, and a right filter controller 242 (referred to as "R filter controller 242" hereinafter) configured to control the right filter 312. For example, if the liquid crystal panel 231 displays the left and right images at 120 Hz, the L filter controller 241 controls the eyeglass device 300 so that the left filter 311 adjusts (increases and reduces) the left light amount with a cycle of 60 Hz. Likewise, the R filter controller 242 controls the eyeglass device 300 so that the right filter 312 adjusts (increases and reduces) the right light amount with a cycle of 60 Hz.

As shown in FIG. 2, in the present embodiment, the display apparatus 200 comprises a first transmitter 243 which transmits a first synchronization signal in synchronism with the left image display, and a second transmitter 244 which transmits a second synchronization signal in synchronism with the right image display. In addition, the eyeglass device 300 comprises a receiver 320 situated between the left and right filters 311, 312. The receiver 320 receives the first and second synchronization signals. The first and second synchronization signals are preferably different in waveform from each other. The receiver 320 distinguishes between the first and second synchronization signals on the basis of the waveforms of the received synchronization signals. Therefore, the eyeglass device 300 operates the left filter 311 in response to the first synchronization signal. The eyeglass device 300 also operates the right filter 312 in response to the second synchronization signal. Other known communication technologies and other known signal processing technologies may be used in the wireless communication of the synchronization signals between the display apparatus 200 and the eyeglass device 300 and internal processes of the synchronization signals by the eyeglass device 300. Alternatively, wired communication of the synchronization signals may be performed between the display apparatus 200 and the eyeglass device 300. The first and second transmitters 243, 244 which transmit the first and second synchronization signals in synchronism with the display of the left and right images, respectively, may be integrated into a single common transmission device. In this case, the left and right images may be alternately displayed in synchronization with rising edges of communalized synchronization signals.

The L and R filter controllers 241, 242 determine a phase of a rise/fall cycle of the left light amount caused by the left filter 311 and a phase of a rise/fall cycle of the right light amount caused by the right filter 312, on the basis of the control signals from the image signal processor 210. The L and R filter controllers 241, 242 output the first and second synchronization signals on the basis of the determined phases. The left and right filters 311, 312 increase/decrease the left and right light amounts, respectively, in synchronization with the display of the left and right images, in response to the first and second synchronization signals.

With taking account of response characteristics of the liquid crystal panel 231 and crosstalk (mutual interference) between the displayed left and right images, the second controller 240 determines periods during which the left or right filters 311, 312 increases the left or right light amount (referred to as "increased light period" hereinafter), and timing (phase) of the increased light period. In the present embodiment, a length of the increased light period is 25% (duty: 25%) of one cycle period (16.7 msec) in which the 60-Hz left and/or right image is displayed. The L filter controller 241 controls the length and the timing of the increased light period for the left light amount. The R filter controller 242 controls the length and the timing of the increased light period for the right light amount. In the present embodiment, the increased light period in correspondence to the left light amount is set at a time period, which is half a left scanning period during which the left image is scanned. The increased light period in correspondence to the right light amount is set at a time period which is half a right scanning period during which the right image is scanned.

The first controller 250, which is operated in response to the 120-Hz control signal from the image signal processor 210, outputs the emission control signal to emit the light from the backlight source 232 in synchronization with light amount adjustments performed by the left and right filters 311, 312. The backlight source 232 blinks in response to the emission control signal. In the present embodiment, under the control of the first controller 250, the backlight source 232 emits the light during a left viewing period in which the left image is viewed (i.e., a period during which the left light amount is increased by the left filter 311 operated under the control of the second controller 240) and a right viewing period in which the right image is viewed (i.e., a period during which the right light amount is increased by the right filter 312 operated under the control of the second controller 240). The left and right viewing periods during which the backlight source 232 emits the light are referred to as "first emission period" in the following descriptions. In the present embodiment, the backlight source 232 also emits the light under the control of the first controller 250, during other periods than the left and right viewing periods (i.e., a non-viewing period in which none of the left and right images is viewed). The other periods than the left and right viewing periods, during which the backlight source 232 emits the light, are referred to as "second emission period" in the following descriptions. The first controller 250 sets the first and second emission periods intermittently.

(Control of Backlight Source)

Figure 3:
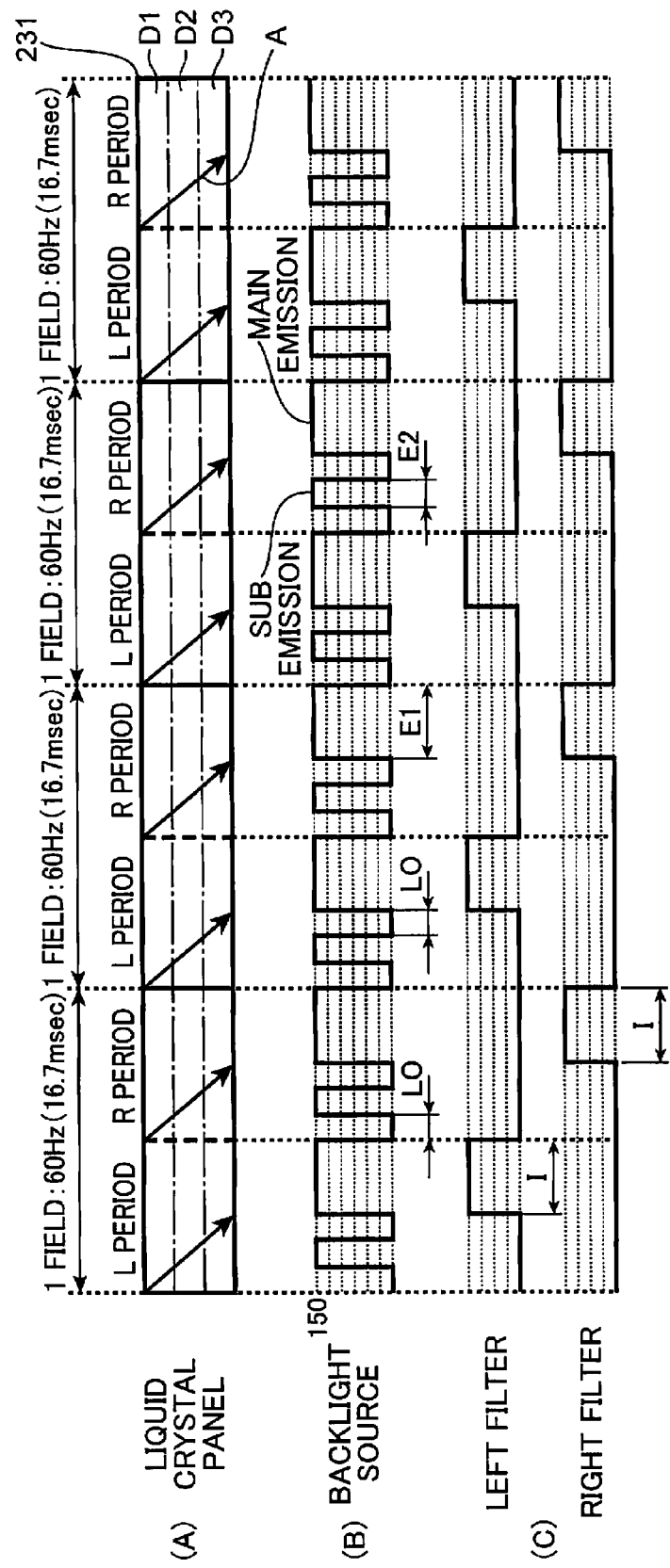
FIG. 3 is a control timing chart schematically showing control of the image viewing system shown in FIG. 1.

FIG. 3 is a schematic control timing chart showing control of the image viewing system 100. Section (A) of FIG. 3 schematically shows scan timing for scanning the images on the liquid crystal panel 231. Section (B) of FIG. 3 shows lighting of the backlight source 232. Section (C) of FIG. 3 schematically shows changes in left light amount adjusted by the left filter 311 of the eyeglass device 300, and changes in right light amount adjusted by the right filter 312. Control of the backlight source 232 is described with reference to FIGS. 1 and 3.

As shown in FIG. 3, one field period of 16.7 msec is divided into the left scanning period (referred to as "L period" hereinafter) and the right scanning period (referred to as "R period" hereinafter). The left image is scanned in the L period. The right image is scanned in the R period. The left image signal is written into the liquid crystal panel 231 in the L period of each field. The right image signal is written into the liquid crystal panel 231 in the R period of each field.

The arrows A shown in section (A) of FIG. 3 indicate directions in which the image signals (L and R signals) are written. The liquid crystal panel 231 shown in section (A) of FIG. 3 includes an upper display area D1 for displaying upper parts of the images, a lower display area D3 for displaying lower parts of the images, and an intermediate display area D2 between the upper and lower display areas D1, D3. The intermediate display area D2 displays an image part between the image parts displayed on the upper and lower display areas D1, D3.

As shown by the arrows A in section (A) of FIG. 3, the image signals (L and R signals) are sequentially written to the upper display area D1, the intermediate display area D2 and the lower display area D3 of the liquid crystal panel 231. In the present embodiment, it takes approximately ¼ of one field (16.7 msec) to write each of the L and R signals.

A numerical value "150" shown in section (B) of FIG. 3 represents a relative luminance of the backlight source 232. For example, the numerical value "150" of the relative luminance of the backlight source 232 may be understood as a relative luminance based on a numerical value "100" (as shown in FIG. 13, for example), which is provided as an appropriate luminance to the backlight source 232 which is turned on all the time.

As shown in section (B) of FIG. 3, the backlight source 232 emits the light in the first and second emission periods E1, E2. A turn-off period LO, in which the backlight source 232 is turned off, is set between the first and second emission periods E1, E2 which are set intermittently. Timing and length of the first emission period E1 are substantially coincident with the timing and length of the increased light period I in which the left or right filter 311, 312 increases the left or right light amount. The second emission period E2 is set within a period in which both of the left and right filters 311, 312 reduce the light amount reaching the left and right eyes (i.e., the period other than the increased light period I). The period in which both of the left and right filters 311, 312 reduce the light amount reaching the left and right eyes is the non-viewing period in which none of the left and right images is viewed. As shown in FIG. 3, the light emission by the backlight source 232 during the first emission period E1 is referred to as "main emission" in the following descriptions. The light emission by the backlight source 232 during the second emission period E2 is referred to as "sub emission".

Functions of the main emission and the sub emission are described. As shown in section (C) of FIG. 3, the increased light period I starts almost at the same time as the completion of scanning the left image in the L period and the completion of scanning the right image in the R period, and ends once the L and R periods are switched over. As a result, the viewer views the left image with the left eye in the L period and the right image with the right eye in the R period.

With the parallax between the left and right images, the brain of the viewer stereoscopically perceives an object depicted in the left and right images. Therefore, the light emission by the backlight source 232 during the increased light period I in which the light amount reaching the left or right eye increases, directly impacts the viewing of the image. The light emission by the backlight source 232 during the first emission period E1 is referred to as "main emission" in the following descriptions.

On the other hand, the light emitted from the backlight source 232 during the period in which the light amount reaching the left and right eyes is reduced (the other period than the increased light period I) (i.e., the light emission by the backlight source 232 during the second emission period E2) is blocked by the left and right filters 311, 312, and therefore does not reach the left and right eyes of the viewer. Therefore, the light emission by the backlight source 232 during the second emission period E2 does not have a direct impact on the viewing of the images. In the following descriptions, the light emission by the backlight source 232 during the second emission period E2 is referred to as "sub emission". In the present embodiment, luminance in the main emission and the sub emission is the relative luminance of "150" (e.g., luminance which is 1.5 times as great as that of the conventional backlight source shown in FIG. 14). The second emission period E2 (i.e., the sub emission period) is approximately ⅓ as long as the first emission period E1 (i.e., the main emission period).

A relationship between the liquid crystal panel 231 and crosstalk is described. The liquid crystal panel 231 comprises a liquid crystal layer (not shown) for displaying images. The liquid crystal driver 220 writing the L or R signal changes orientations of liquid crystal molecules included in the liquid crystal layer of the liquid crystal panel 231 to adjust light transmittance of the liquid crystal panel 231. If the backlight source 232 radiates the light to the liquid crystal panel 231, the luminance of the liquid crystal panel 231 changes in response to the change in light transmittance of the liquid crystal panel 231, so that the viewer may view the left or right image in response to the L or R signal, which is written by the liquid crystal driver 220.

In general, response of the liquid crystal molecules with respect to the writing of the image signal (L and/or R signals) by the liquid crystal driver 220 become slow under a low temperature of the liquid crystal layer of the liquid crystal panel 231, which means that it takes longer to change the light transmittance of the liquid crystal panel 231 after the image signal is written to the liquid crystal panel 231. Unless the change in light transmittance of the liquid crystal panel 231 (the change in light transmittance in response to the writing of the image signal) is completed before the start of the increased light period I, a part of the image, which is depicted before the image signal is written, passes through the left or right filter 311, 312 and reaches the left or right eye. Consequently, the left image is viewed with the right eye while the right image is viewed with the left eye. Such trouble is referred to as "crosstalk".

As shown in FIG. 3, the luminance of the backlight source 232 is set at a high value during the first emission period E1 to increase a temperature of the liquid crystal panel 231. The second emission period E2 is set to moderate a temperature drop of the liquid crystal panel 231. Therefore, it becomes less likely that there is a delayed response of the liquid crystal of the liquid crystal panel 231. Thus, the image viewing system 100 according to the present embodiment may show a quality stereoscopic image with less crosstalk.

In general, the luminance of the LEDs used in the backlight source 232 is adjusted by changing a driving current applied to the LEDs and at least one of the light emission periods (light emission duties). In the present embodiment, the timing and the length of the first emission period E1 are set to substantially coincide with the timing and length of the increased light period I, which is defined for displaying each of the left and right images.

In the present embodiment, the luminance of the LEDs in the first emission period E1 is adjusted by means of the driving current applied to the LEDs. The applied driving current to the LEDs is preferably adjusted within a less influential range to operation life of the LEDs, a less influential range to display color changes resulting from emission color changes, and/or a range to achieve efficient light emission in terms of saving electricity. As a result, it becomes less likely that there is the shortened operation life, the emission color changes (chromaticity), and/or the inefficient light emission.

Instead of the increase rate of the luminance described in the present embodiment, which is 1.5 times as great as that of the conventional backlight source, the luminance of the backlight source 232 may be changed to another increase rate in accordance with the type of the LED elements or a combination of a driving current and a light emission duty. For example, the luminance increase rate of the backlight source 232 is preferably determined on the basis of the life of the LED elements. Pulse width modulation (PWM) driving on the LED elements may be performed, instead of the luminance adjustment of the backlight source 232 on the basis of the driving current applied to the LED elements, in order to adjust the luminance of the backlight source 232. The pulse width modulation (PWM) driving may be performed to control the backlight source 232 so that the backlight source 232 reduces the luminance.

In the present embodiment, a high luminance is set for the backlight source 232 in the first emission period E1, which is directly influential on the viewing of a stereoscopic image. Therefore, a bright stereoscopic image may be displayed so that the viewer may easily view the image.

As described above, the sub emission happened in the second emission period E2 is less likely to affect the viewing of the stereoscopic image (because the optical filter portion 310 reduces the light transmission). Therefore, the sub emission in the second emission period E2 increases the temperature of the liquid crystal panel 231 with little effect on the viewing of the stereoscopic image. As a result of the temperature increase of the liquid crystal panel 231 due to the sub emission in the second emission period E2, the response speed of the liquid crystal molecules of the liquid crystal panel 231 goes up. Accordingly, the response of the liquid crystal to display the left and/or right images is completed within a short time to decrease the crosstalk between the left and right images. In the present embodiment, the luminance in the sub emission and the length of the second emission period E2 are determined to achieve a sufficiently high response speed of the liquid crystal of the liquid crystal panel 231 with matching the luminance in the sub emission and the length of the second emission period E2 with operation conditions of the optical filter portion 310.

As described above, the luminance of the sub emission in the second emission period E2 is substantially equal to the luminance of the main emission in the first emission period E1. The second emission period E2 is approximately ⅓ times as long as the first emission period E1. Alternatively, another luminance of the sub emission or another second emission period E2, which is determined to match with the characteristics of the liquid crystal panel 231 and/or operating conditions of the eyeglass device 300, may be used. As described above, the luminance of the LEDs in the second emission period E2 is preferably determined with taking account of the life and reliability of the LEDs. If the temperature of the liquid crystal panel 231 is sufficiently increased by the main emission in the first emission period E1, the sub emission in the second emission period E2 may be omitted.

<Second Embodiment>

(Configuration of Image Viewing System)

Figure 4:
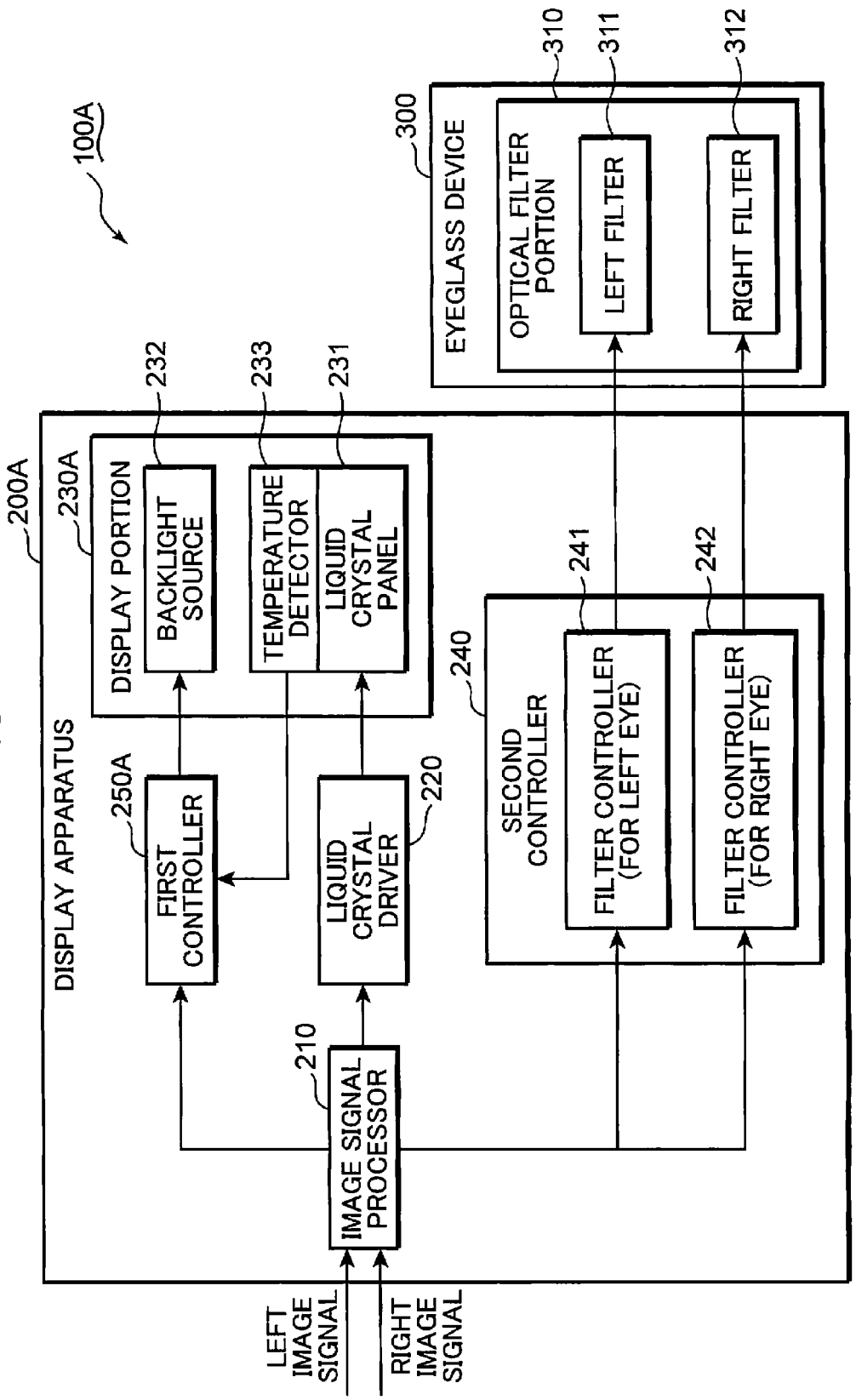
FIG. 4 is a schematic block diagram showing a configuration of an image viewing system according to the second embodiment.

FIG. 4 is a block diagram schematically showing a configuration of an image viewing system 100A according to the second embodiment. Differences between the image viewing systems 100A, 100 according to the second and first embodiments are described.

The image viewing system 100A comprises the same eyeglass device 300 as that of the first embodiment, and a display apparatus 200A configured to alternately display the left and right images. The display apparatus 200A comprises the image signal processor 210, the liquid crystal driver 220, a display portion 230A, a first controller 250A, and the second controller 240. In the present embodiment, the display portion 230A includes a temperature detector 233 in addition to the backlight source 232 and the liquid crystal panel 231 which are the same as those of the first embodiment.

The temperature detector 233 detects the temperature of the liquid crystal panel 231 to output a temperature signal, which corresponds to the detected temperature, to the first controller 250A. The first controller 250A outputs not only a control signal output from the image signal processor 210 but also an emission control signal to the backlight source 232, in order to adjust the length of each light emission period of the backlight source 232 and the timing of the light emission period on the basis of the temperature signal from the temperature detector 233.

Figure 5:
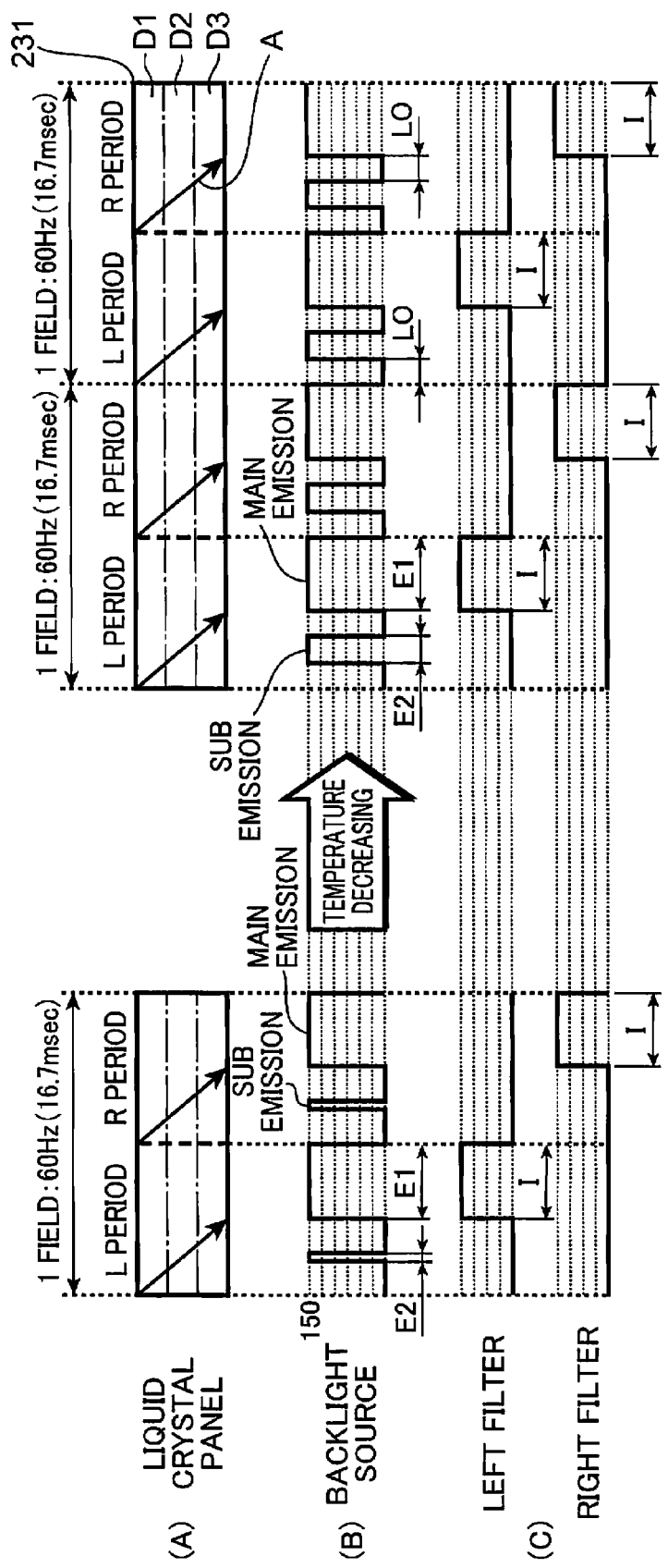
FIG. 5 is a control timing chart schematically showing control of the image viewing system shown in FIG. 4.

FIG. 5 is a control timing chart schematically showing control of the image viewing system 100A. The left side of FIG. 5 shows control performed on the backlight source 232 under a high temperature of the liquid crystal panel 231. The right side of FIG. 5 shows control performed on the backlight source 232 if the temperature of the liquid crystal panel 231 goes down. Section (A) of FIG. 5 schematically shows scan timing for scanning an image on the liquid crystal panel 231. Section (B) of FIG. 5 shows lighting of the backlight source 232. Section (C) of FIG. 5 schematically shows changes in left light amount adjusted by the left filter 311 of the eyeglass device 300, and changes in right light amount adjusted by the right filter 312. Differences in control of the backlight source 232 between the first and second embodiments are described with reference to FIGS. 4 and 5.

As shown in section (A) of FIG. 5, the left and right image signals are written to the liquid crystal panel 231 by the liquid crystal driver 220 like the first embodiment. Operations of the optical filter portion 310 (the left and right filters 311, 312) under the control of the second controller 240 are also the same as those of the first embodiment. As shown in section (B) of FIG. 5, the first controller 250A changes the length (light emission duty) of the second emission period E2 in response to the detected temperature of the liquid crystal panel 231. It should be noted that the length and the timing of the first emission period E1 are the same as those described in the first embodiment. Like the first embodiment, the turn-off period LO is set between the first and second emission periods E1, E2. Changes in control performed on the backlight source 232 by the first controller 250A are described hereinafter. It should be noted that the control changes happen if the temperature of the liquid crystal panel 231 decreases from a high temperature condition of the liquid crystal panel 231 (the left side of FIG. 5). For example, the changes in temperature of the liquid crystal panel 231 are caused by ambient temperature changes or continuous operation time of the display apparatus 200A.

The luminance of the backlight source 232, which blinks under the control of the first controlling unit 250A, is a relative luminance of "150" in both of the first and second emission periods E1, E2. In the present embodiment, the first controller 250A keeps the luminance of the backlight source 232 constant, regardless of the changes in temperature of the liquid crystal panel 231.

If the liquid crystal achieves a sufficiently high response speed under a temperature condition (see the left side of FIG. 5), the first controller 250A controls the backlight source 232 so as to set a short second emission period E2. If the temperature of the liquid crystal panel 231 becomes less than a predetermined value, the first controller 250A controls the backlight source 232 to increase the length of the second emission period E2 (see the right side of FIG. 5). As a result, the temperature of the liquid crystal panel 231 is kept so that the response speed of the liquid crystal stays at a level high enough to prevent the crosstalk. Therefore, the crosstalk between the left and right images is preferably less likely to occur.

FIG. 6 is a graph showing a relationship between the temperature of the liquid crystal panel 231 and the second emission period E2 (sub emission duty) set according to the temperature of the liquid crystal panel 231. The horizontal axis of the graph in FIG. 6 represents a temperature of the liquid crystal panel 231. The vertical axis of the graph in FIG. 6 represents a sub emission duty where a ratio of the second emission period E2 is expressed in percentage (%) if one field (60 Hz) cycle is 100%. Adjustment and control of the length of the second emission period E2 is further described with reference to FIGS. 4 to 6.

In FIG. 6, an appropriate temperature range for displaying a stereoscopic image is described as "stereoscopic display temperature range". The upper limit of the stereoscopic display temperature range is expressed by "$T_H$". The lower limit of the stereoscopic display temperature range is expressed by "$T_L$". The threshold set for a temperature of the liquid crystal of the liquid crystal panel 231 is expressed by "$T_{TH}$". If the temperature of the liquid crystal panel 231 is no less than $T_{TH}$ and no more than $T_H$, the liquid crystal of the liquid crystal panel 231 has a sufficient response speed. Therefore, the liquid crystal panel 231 may show the viewer images (the left and right images) with sufficiently decreased crosstalk between the left and right images. Meanwhile, the first controller 250A controls the backlight source 232 so as to set the sub emission duty at 0% (i.e., so as not to provide the second emission period E2).

The term "DMAX" shown in the vertical axis of the graph in FIG. 6 represents a duty of the sub emission period with respect to the longest second emission period E2. In other words, a value obtained by adding the second emission period E2 to the first emission period E1 becomes equal to one field if the duty value of the sub emission period is DMAX. If the temperature of the liquid crystal panel 231 falls below the $T_{TH}$, the first controller 250A controls the backlight source 232 so as to gradually increase the duty of the sub emission period (i.e., to lengthen the second emission period E2). In the control performed on the duty of the sub emission period as shown in FIG. 6, the first controller 250A controls the backlight source 232 so that the duty value of the sub emission period becomes DMAX if the temperature of the liquid crystal panel 231 is $T_L$.

According to the control on the duty of the sub emission period shown in FIG. 6, the display apparatus 200A may consume less power to prevent the changes in temperature of the liquid crystal panel 231 from causing the crosstalk between the left and right images. Therefore, the display apparatus 200A may show the viewer a quality stereoscopic image with low power consumption, under various environments or operation conditions in which the display apparatus 200A is situated.

Figures 7A, 7B:
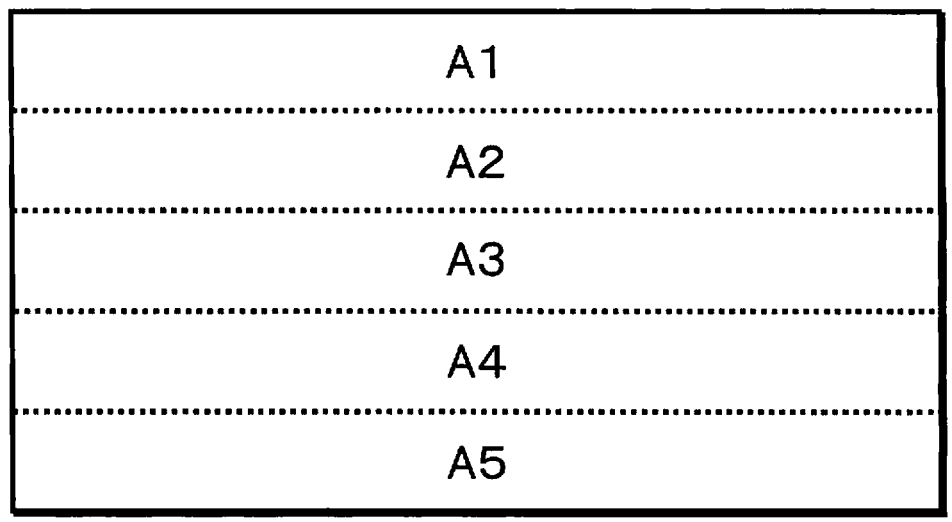
FIG. 7A is a schematic view of a display area of the liquid crystal panel to depict a method for detecting the temperature of the liquid crystal panel by means of a temperature detector of the image viewing system shown in FIG. 4.
FIG. 7B is a schematic view of a display area of the liquid crystal panel to depict the method for detecting the temperature of the liquid crystal panel by means of the temperature detector of the image viewing system shown in FIG. 4.

FIGS. 7A and 7B show a method for detecting the temperature of the liquid crystal panel 231 by means of the temperature detector 233. FIGS. 7A and 7B show display areas of the liquid crystal panel 231. The display area of the liquid crystal panel 231 shown in FIG. 7A is conceptually divided in a sub-scanning direction (traverse direction) in which the image signals are written by the liquid crystal driver 220. The display area of the liquid crystal panel 231 shown in FIG. 7B is conceptually divided into rows and columns. Detection of the temperature of the liquid crystal panel 231 by the temperature detector 233 is described with reference to FIGS. 4 to 7B.

The display area of the liquid crystal panel 231 shown in FIG. 7A is conceptually divided into areas A1 to A5. Each of the areas A1 to A5 is used for integrally displaying the left and right images, respectively. The backlight source 232 includes a radiation area (not shown) configured to radiate the light to each of the areas A1 to A5. The temperature detector 233 detects a temperature of each area A1 to A5. The first controller 250A independently controls the length of the second light emission E2 in the corresponding radiation areas to the areas A1 to A5. For example, if the temperature detector 233 detects lower temperature in the area A3 than the other areas, the first controller 250A controls the backlight source 232 so as to make the second emission period E2 of the corresponding radiation area to the area A3 longer than the other areas.

Alternatively, the temperature detector 233 may measure the temperature in one of the areas A1 to A5. The temperature detector 233 may output an average temperature among the areas A1 to A5 as the temperature of the liquid crystal panel 231. The first controller 250A may control the backlight source 232 so that the second emission period E2 of a corresponding radiation area to a lower area (e.g., the area A5 or A4) becomes longer than the second emission period E2 of a corresponding radiation area to a higher area (e.g., the area A1 or A2). For instance, the first controller 250A may control the backlight source 232 so that the duties of the sub emission periods of the corresponding radiation areas to the areas A4 and A5 are more than the duty of the sub emission period of the radiation area corresponding to the area A3 by 5%, and so that the duties of the sub emission periods of the radiation areas corresponding to the areas A1 and A2 are lower than the same by 5%. Accordingly, the second emission period E2 may be adjusted in consideration of effect from thermal convection.

As shown in FIG. 7B, the display area of the liquid crystal panel 231 may be conceptually divided into rows and columns. As described with reference to FIG. 7A, the backlight source 232 includes radiation areas corresponding to the conceptual divisional areas (areas A11 to A53 in FIG. 7B) of the liquid crystal panel 231. The temperature detector 233 detects temperatures of the areas A11 to A53, respectively. The first controller 250A adjusts the lengths of the second emission periods E2 of the corresponding radiation area to the areas A11 to A53 in response to the detected temperatures, respectively. An increase in number of areas obtained by conceptually dividing the display area and number of the radiation areas which may be controlled independently results in precise control of the backlight source 232 in accordance with characteristics of the display apparatus 200A. For example, if there is an element which causes large heat near the area A42, the temperature detector 233 detects a temperature rise of the liquid crystal which is caused by the element. As a result, the first controller 250A may appropriately control the backlight source 232 without excessively lengthening the second emission period E2 of the area A42 and/or the surrounding area, which results in power saving of the display apparatus 200A.

<Third Embodiment>

The configuration of the image viewing system 100A described with reference to FIG. 4 is incorporated in the third embodiment. In the third embodiment, the first controller 250A adjusts the luminance of the backlight source 232 in the second emission period E2 in response to the temperature of the liquid crystal panel 231, instead of the length of the second emission period E2.

FIG. 8 is a control timing chart schematically showing control of the image viewing system 100A. The left side of FIG. 8 shows control, which is performed on the backlight source 232 if the temperature of the liquid crystal panel 231 is high. The right side of FIG. 8 shows control which is performed on the backlight source 232 if the temperature of the liquid crystal panel 231 goes down. Section (A) of FIG. 8 schematically shows scan timing for scanning the images on the liquid crystal panel 231. Section (B) of FIG. 8 shows lighting of the backlight source 232. Section (C) of FIG. 8 schematically shows changes in left light amount adjusted by the left filter 311 of the eyeglass device 300, and changes in right light amount adjusted by the right filter 312. Differences in control of the backlight source 232 between the second and third embodiments are described with reference to FIGS. 4 and 8.

As shown in section (A) of FIG. 8, the left and right image signals are written to the liquid crystal panel 231 by the liquid crystal driver 220, like the second embodiment. The operations of the optical filter portion 310 (the left and right filters 311, 312) under the control of the second controller 240 are also the same as those of the second embodiment. The length and the timing of the first emission period E1 and the luminance of the backlight source 232 in the first emission period are the same as those described in the second embodiment. Like the second embodiment, the turn-off period LO is set between the first and second emission periods E1, E2.

As shown in section (B) of FIG. 8, the first controller 250A changes the luminance of the backlight source 232 in the second emission period E2 in response to the temperature of the liquid crystal panel 231 detected by the temperature detector 233. Changes in the control performed on the backlight source 232 by the first controller 250A are described hereinafter. It should be noted that the changes of the control happen if the temperature of the liquid crystal panel 231 goes down from a high temperature condition of the liquid crystal panel 231 (the left side of FIG. 8).

In the present embodiment, the first controller 250A keeps the lengths and the timings of the first and second emission periods E1, E2 constant, regardless of the changes in temperature of the liquid crystal panel 231.

The first controller 250A turns the backlight source 232 on at a low luminance (a relative luminance of "50" is shown on the left side of FIG. 8) in the second emission period E2 if the liquid crystal achieves a sufficiently high response speed under the temperature condition. If the temperature of the liquid crystal panel 231 becomes no more than a predetermined value, the first controller 250A increases the luminance of the backlight source 232 in the second emission period E2 (a relative luminance of "150" is shown on the right side of FIG. 8). As a result, the temperature of the liquid crystal panel 231 increases to make the response speed of the liquid crystal high. Therefore, the crosstalk between the left and right images is less likely to occur. As described above, the driving current, which is applied to the LEDs of the backlight source 232 in order to adjust the luminance of the LEDs, is preferably determined in light of the life and reliability of the LEDs.

Figure 9:
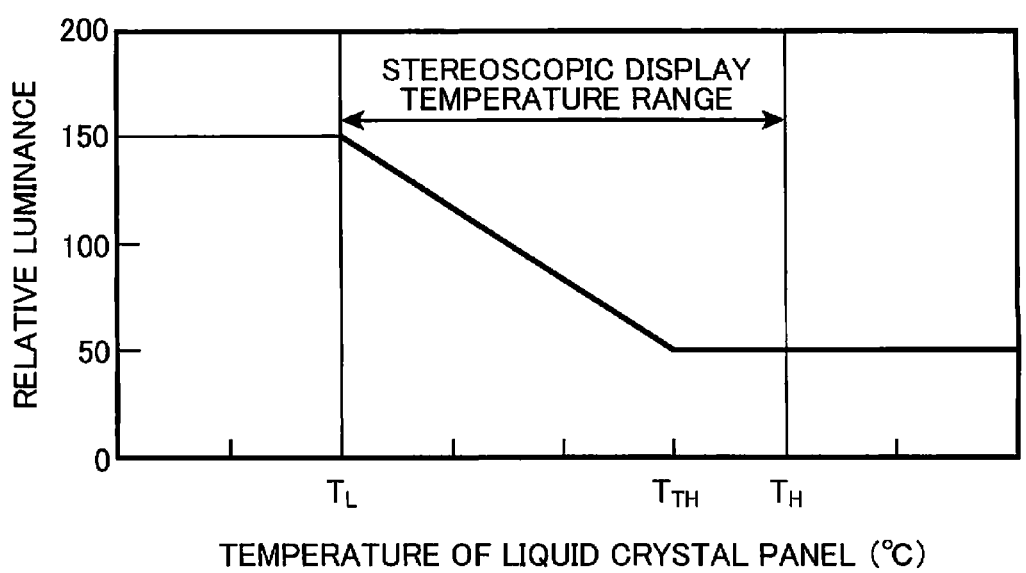
FIG. 9 is a graph depicting a relationship between a temperature of a liquid crystal panel used in the control of the image viewing system showing FIG. 8, and luminance of a backlight source during a second emission period set in correspondence with the temperature of the liquid crystal panel.

FIG. 9 is a graph showing a relationship between the temperature of the liquid crystal panel 231 and the relative luminance of the backlight source 232 obtained during the second emission period E2 set in response to the temperature of the liquid crystal panel 231. The horizontal axis of the graph in FIG. 9 represents the temperature of the liquid crystal panel 231. The vertical axis of the graph in FIG. 9 represents the relative luminance of the backlight source 232 obtained during the second emission period E2. Adjustment and control of the luminance of the backlight source 232 in the second emission period E2 is further described with reference to FIGS. 4, 8 and 9.

In FIG. 9, an appropriate temperature range for displaying a stereoscopic image is described as "stereoscopic display temperature range". The upper limit of the stereoscopic display temperature range is expressed by "$T_H$". The lower limit value of the stereoscopic display temperature range is expressed by "$T_L$". The threshold for the temperature of the liquid crystal of the liquid crystal panel 231 is expressed by "$T_{TH}$". If the temperature of the liquid crystal panel 231 is no less than $T_{TH}$ and no more than $T_H$, the liquid crystal of the liquid crystal panel 231 achieves a response speed high enough for the liquid crystal panel 231 to show the viewer images (the left and right images) with sufficiently little crosstalk between the left and right images. Meanwhile, for example, the first controller 250A controls the backlight source 232 so that the relative luminance of the backlight source 232 in the second emission period E2 becomes "50". The relationship between the relative luminance and the temperature of the liquid crystal panel 231 shown in FIG. 9 does not limit the principles of the present embodiment at all. For example, if the temperature of the liquid crystal panel 231 is sufficiently high, the first controller 250A may turn the backlight source 232 off. Therefore, like the second embodiment, for example, if the temperature of the liquid crystal panel 231 is no less than "$T_{TH}$", the first controller 250A may control the backlight source 232 so that the relative luminance of the backlight source 232 becomes "0".

If the temperature of the liquid crystal panel 231 falls below the $T_{TH}$, the first controller 250A controls the backlight source 232 so as to gradually increase the relative luminance of the backlight source 232 in the second emission period E2. In the control performed on the luminance of the backlight source 232 during the second emission period E2 shown in FIG. 9, the first controller 250A controls the backlight source 232 so that the relative luminance of the backlight source 232 in the second emission period E2 becomes "150" if the temperature of the liquid crystal panel 231 is $T_L$.

According to the control on the luminance of the backlight source 232 in the second emission period E2 shown in FIG. 9, it becomes less likely under low power consumption that the display apparatus 200A causes crosstalk between the left and right images even if there are changes in temperature of the liquid crystal panel 231, which may cause the crosstalk. Thus, the display apparatus 200A may show the viewer a quality stereoscopic image with low power consumption under various environments or operation conditions in which the display apparatus 200A is situated.

As described with reference to FIGS. 7A and 7B, in the present embodiment as well, the temperature detector 233 may measure the temperatures of the areas A1 to A5 (see FIG. 7A) or the areas A11 to A53 (see FIG. 7B), which are conceptually defined in the display area of the liquid crystal panel 231. The first controller 250A may independently adjust the luminance of the radiation areas corresponding to the areas A1 to A5 (see FIG. 7A) or the areas A11 to A53 (see FIG. 7B), which are conceptually defined in the display area of the liquid crystal panel 231. For example, if the area A2 shown in FIG. 7A has lower luminance than the other areas A1 and A3 to A5, the first controller 250A may make the luminance of the radiation area of the backlight source 232, which radiates the light to the area A2, higher than that of the other areas in the second emission period E2. Alternatively, the first controller 250A may control the backlight source 232 in consideration of heat transfer in the display apparatus 200A so that the luminance of the radiation areas, which radiates the light to the upper areas of the liquid crystal panel 231, becomes higher than the luminance of the radiation areas, which radiate the light to the lower areas of the liquid crystal panel 231.

In the second and third embodiments, a temperature sensor used as the temperature detector 233 measures the temperature of the liquid crystal panel 231. Alternatively, a temperature sensor configured to detect a temperature of an environment where the display apparatus 200A is situated may be used as the temperature detector 233.

In the second embodiment, the length of the second emission period E2 is independently adjusted. In the third embodiment, the luminance of the backlight source 232 in the second emission period E2 is adjusted. Alternatively, the first controller 250A may adjust both the length of the second emission period E2 and the luminance of the backlight source 232 in the second emission period E2, in response to the temperature of the liquid crystal panel 231.

The relationship between the temperature of the liquid crystal panel 231 and the length of the second emission period E2 shown in FIG. 6 and the relationship between the temperature of the liquid crystal panel 231 and the relative luminance of the backlight source 232 in the second emission period E2 shown in FIG. 9, are exemplary. Therefore, other settings about these relationships may be used.

<Fourth Embodiment>

The configuration of the image viewing system 100A described with reference to FIG. 4 is incorporated in the fourth embodiment. In the fourth embodiment, the first controller 250A controls the timing of the first emission period E1 for each of the radiation areas of the backlight source 232, in response to a control signal from the image signal processor 210.

Figure 10:
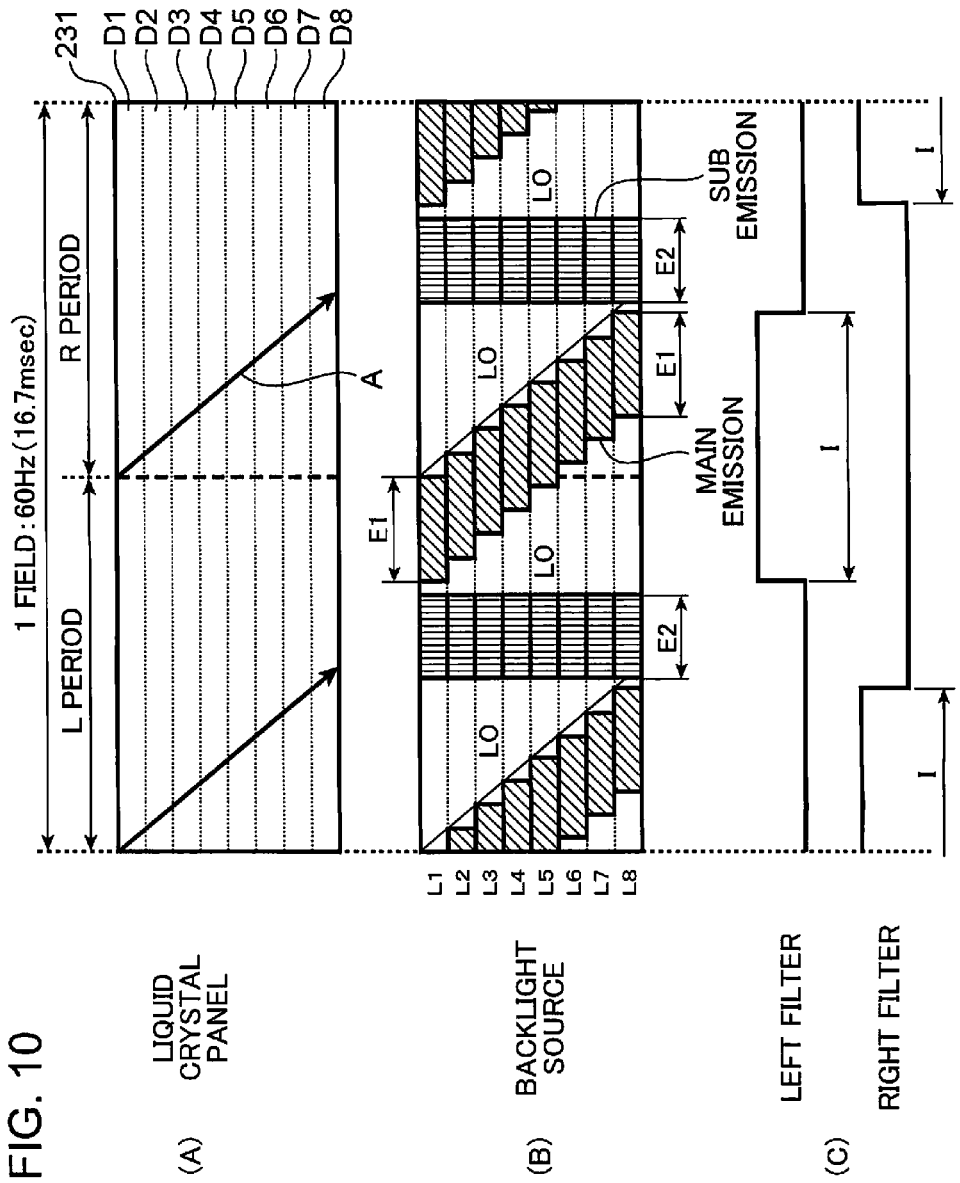
FIG. 10 is a schematic control timing chart showing control of an image viewing system according to the fourth embodiment.

FIG. 10 is a control timing chart schematically showing control of the image viewing system 100A. Section (A) of FIG. 10 schematically shows scan timing for scanning the images on the liquid crystal panel 231. Section (B) of FIG. 10 shows lighting of the backlight source 232. Section (C) of FIG. 10 schematically shows changes in left light amount adjusted by the left filter 311 of the eyeglass device 300, and changes in right light amount adjusted by the right filter 312. Differences in control of the backlight source 232 between the first and fourth embodiments are described with reference to FIGS. 4 and 10.

As shown in section (A) of FIG. 10, the left and right image signals are written to the liquid crystal panel 231 by the liquid crystal driver 220, like the first embodiment. It should be noted that the display area of the liquid crystal panel 231 is conceptually divided into the area D1 (the uppermost display area) to the area D8 (the lowermost display area) for convenience of explanation.

The backlight source 232 shown in section (B) of FIG. 10 includes eight radiation areas L1 to L8, which are divided in the sub-scanning direction of the images (the left and right images) by the liquid crystal driver 220. Each of the radiation areas L1 to L8 radiates the light to the areas D1 to D8 of the liquid crystal panel 231. The first controller 250A adjusts turn-on timing and length of a turn-on period (the first and second emission periods E1, E2) of the backlight source 232 in each of the radiation areas L1 to L8. In each of the radiation areas L1 to L8, the first controller 250A sets the first emission period E1, within which the backlight source 232 performs the main emission that directly affects the viewing of the images, and the second emission period E2 within which the backlight source 232 performs the sub emission that does not directly affect the viewing of the images. In each of the radiation areas L1 to L8, the turn-off period LO, during which the backlight source 232 is turned off, is set between the first and second emission periods E1, E2.

The main emission of the backlight source 232 in the first emission period E1 is described. As shown by the arrows A in section (A) of FIG. 10, the image signals (the left and right image signals) are written from the area D1 situated in an upper portion of the liquid crystal panel 231 to the area D8 situated in a lower portion of the liquid crystal panel 231. Thus, the liquid crystal layer of the liquid crystal panel 231 starts the response from the area D1 and ends it at the area D8, so that an upper portion of the liquid crystal panel is subjected to the switching operation from the left image to the right image and vice versa earlier to display the images.

As shown in section (C) of FIG. 10, the second controller 240 controls the optical filter portion 310 of the eyeglass device 300 so as to increase the light amount passing through the left or right filter 311, 312 from a response completion time of the liquid crystal layer of the liquid crystal panel 231 in the area D1 to a response completion time of the liquid crystal layer in the area D8. Therefore, the increased light period I is set over a switching time between the L and R periods. The increased light period I starts before the switching time between the L and R periods, and ends after the switching time between the L and R periods.

In the area D1 of the liquid crystal panel 231, if the liquid crystal completes the response to the writing of the image signals, the first controller 250A controls the backlight source 232 to turn the radiation area L1 on. Thereafter, the first controller 250A controls the backlight source 232 to turn the radiation area L1 off before the subsequent image signal writing is started in the area D1 of the liquid crystal panel 231. As a result of turning on and off the corresponding radiation area L1 of the backlight source 232 in synchronization with the writing of the image signal to the area D1 of the liquid crystal panel 231 (or the completion of the liquid crystal response in the liquid crystal panel 231), the image (the left or right image) displayed on the area D1 of the liquid crystal panel 231 reaches the left or right eye. The descriptions related to the area D1 of the liquid crystal panel 231 and the radiation area L1 of the backlight source 232 are similarly applied to the areas D2 to D8 and the corresponding radiation areas L2 to L8, which are located below the area D1 and the radiation area L1, respectively. Therefore, the backlight source 232 is sequentially turned on and off from the upper portion to the lower portion.

As described above, in each of the areas, each of the radiation areas L1 to L8 of the backlight source 232 is turned on after the image signals are written to the liquid crystal panel 231 and after the liquid crystal completes the response to the writing. Therefore, the viewer may enjoy viewing a stereoscopic image with sufficiently decreased crosstalk between the left and right images. If the timing to turn on/off each of the radiation areas L1 to L8 is independently controlled, the first emission period E1 may be made longer as a whole than those of the first to third embodiments (in which the entire backlight source 232 emits the light at once). As a result, the viewer may enjoy viewing a brighter stereoscopic image. The method for turning on the backlight source 232, which is described with reference to FIG. 10 (the method for sequentially turning on/off each of the radiation areas L1 to L8), is referred to as "backlight scan" (or "backlight scroll"). The backlight scan controls of the backlight source 232, which is performed in response to the writing of the left image signal, may be substantially the same as the backlight scan control of the backlight source 232, which is performed in response to the writing of the right image signal. If the liquid crystal panel 231 displays the left and right images under the backlight scanning, the viewer may view a brighter and quality stereoscopic image with little crosstalk.

It should be noted in section (C) of FIG. 10 that the increased light period I is set so as to cover a period between a starting point of the backlight scan (i.e., a starting time of the first emission period E1 in the radiation area L1) and an ending point of the backlight scan (i.e., an ending time of the first emission period E1 in the radiation area L8).

The sub emission of the backlight source 232, which is performed in the second emission period E2, is described. As shown in FIG. 10, the second emission period E2 is set in another period than the increased light period I (i.e., a period in which the left and right filters 311, 312 reduces the transmission light amount from the images displayed on the liquid crystal panel 231). Like the first to third embodiments, if there is the second emission period E2, the temperature of the liquid crystal panel 231 is less likely to go down. As a result, the crosstalk between the left and right images is less likely to occur.

In the present embodiment, the second emission period E2 turns the backlight source 232 on so as to substantially cover other periods than the increased light period I. Alternatively, the length of the second emission period E2 (i.e., the sub emission duty) may be determined as a fixed value at which appropriate response characteristics of the liquid crystal may be effected regardless of the temperature around the display apparatus 200A. Likewise, the luminance of the backlight source 232 in the second emission period E2 may be determined as a fixed value at which appropriate response characteristics of the liquid crystal may be achieved regardless of the temperature around the display apparatus 200A. The temperature detector 233 may be omitted if the length of the second emission period E2 and/or the level of the luminance of the backlight source 232 in the second emission period E2 are determined as a fixed value.

Alternatively, the length of the second emission period E2 and/or the luminance of the backlight source 232 in the second emission period E2 may be adjusted in response to the temperature of the liquid crystal panel 231 detected by the temperature detector 233 or the temperature around the display apparatus 200A. The crosstalk is less likely to occur with low power consumption under the adjustment for the length of the second emission period E2 and/or the luminance of the backlight source 232 in the second emission period E2 in response to the temperature of the liquid crystal panel 231 or the temperature around the display apparatus 200A.

<Fifth Embodiment>

The configuration of the image viewing system 100A described with reference to FIG. 4 is incorporated in the fifth embodiment. In the fifth embodiment, in addition to the timing of the first emission period E1, the first controller 250A adjusts the timing and the length of the second emission period E2 for each of the radiation areas of the backlight source 232 in response to a control signal from the image signal processor 210.

Figure 11:
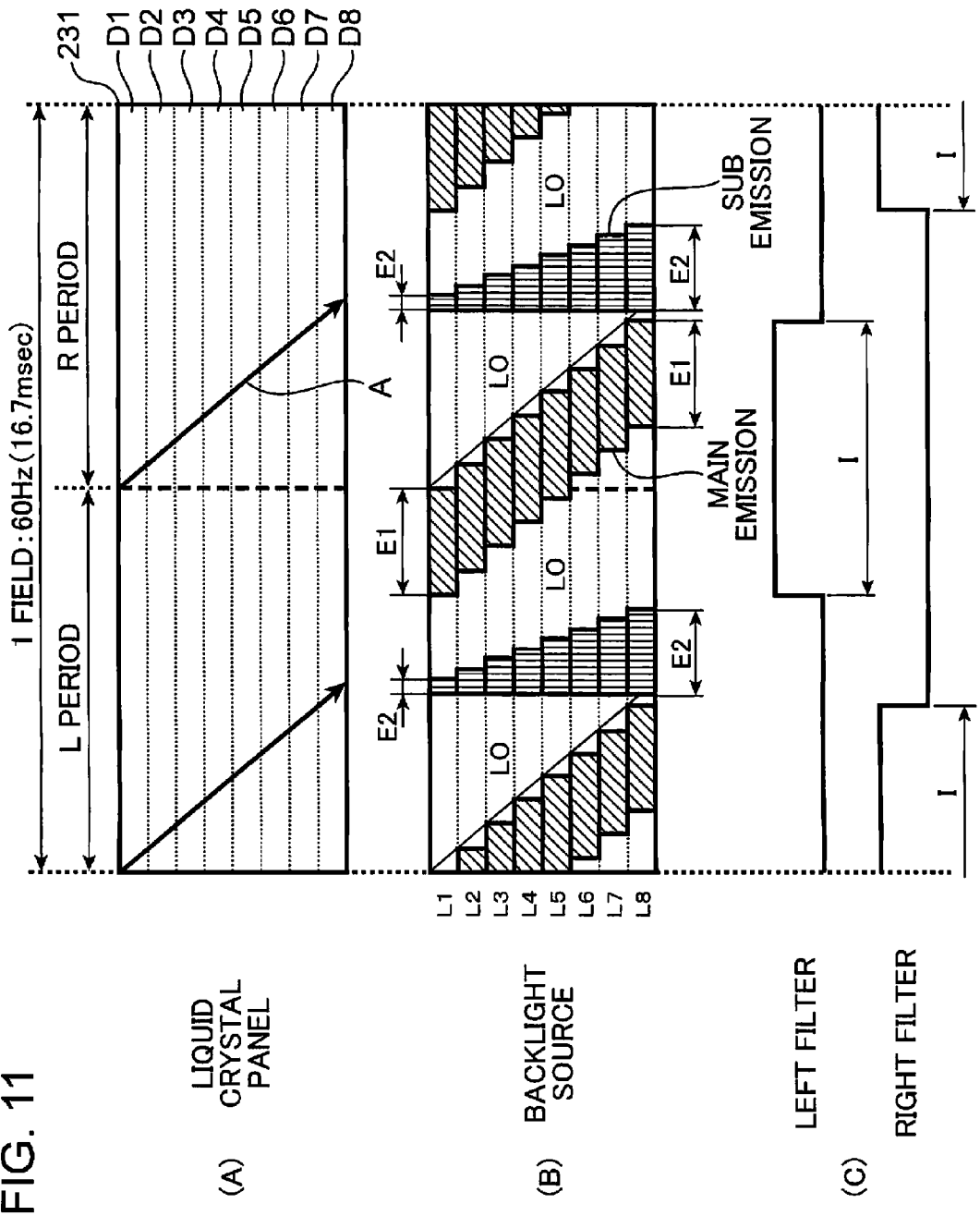
FIG. 11 is a control timing chart schematically showing control of an image viewing system according to the fifth embodiment.
Figure 12:
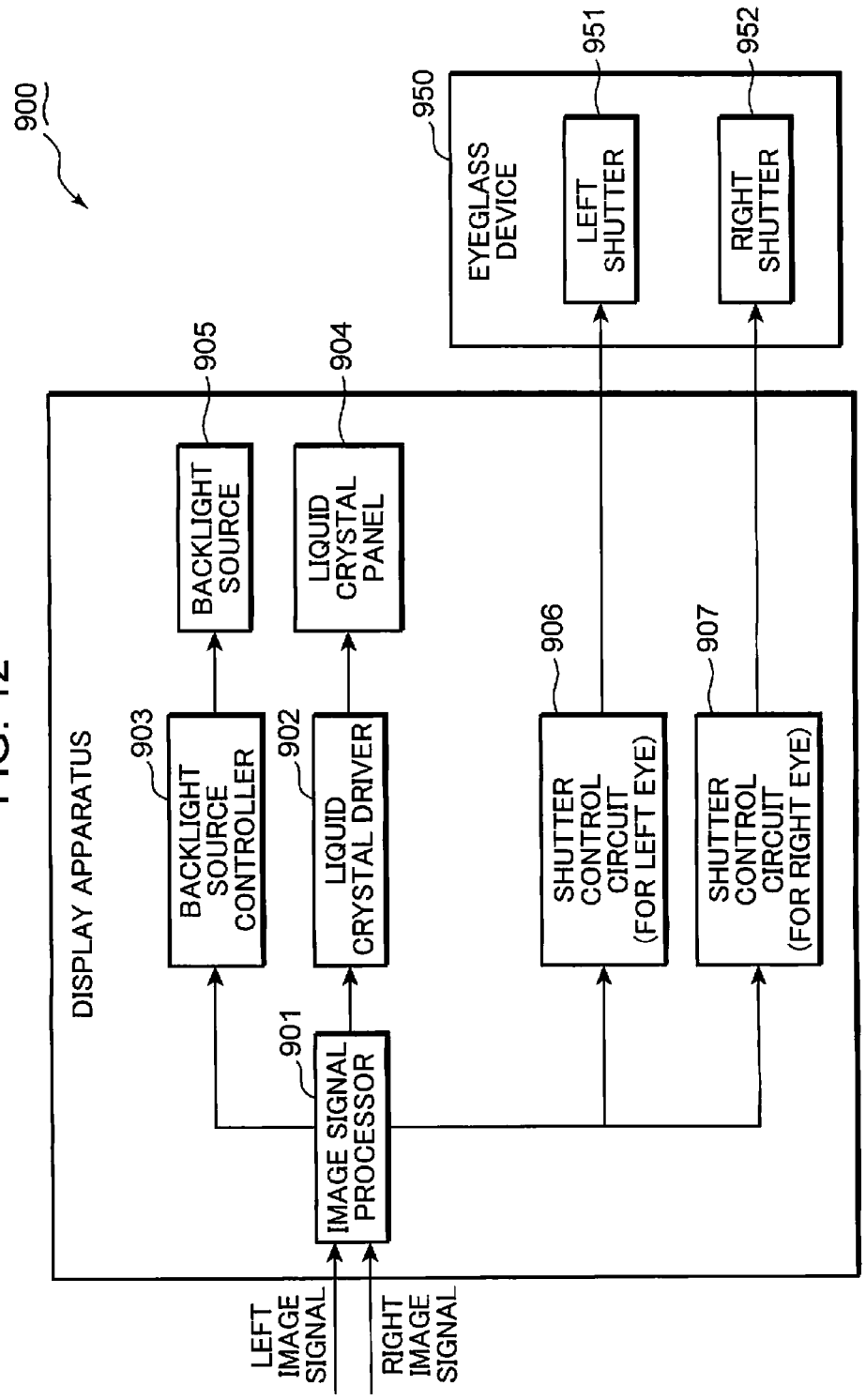
FIG. 12 is a block diagram schematically showing a configuration of a conventional image viewing system.

FIG. 11 is a control timing chart schematically showing control of the image viewing system 100A. Section (A) of FIG. 11 schematically shows scan timing for scanning the images on the liquid crystal panel 231. Section (B) of FIG. 11 shows lighting of the backlight source 232. Section (C) of FIG. 11 schematically shows changes in left light amount adjusted by the left filter 311 of the eyeglass device 300, and changes in right light amount adjusted by the right filter 312. Differences in control of the backlight source 232 between the fourth and fifth embodiments are described with reference to FIGS. 4 and 11.

As shown in section (A) of FIG. 11, the left and right image signals are written to the liquid crystal panel 231 by the liquid crystal driver 220, like the fourth embodiment. Like the fourth embodiment, the display area of the liquid crystal panel 231 is conceptually divided into the area D1 (the uppermost display area) to the area D8 (the lowermost display area) for convenience of explanation. A correspondence relationship between the areas D1 to D8 and the radiation areas L1 to L8 of the liquid crystal panel 231 is the same as that of the fourth embodiment. In addition, like the fourth embodiment, the second controller 240 controls the optical filter portion 310 of the eyeglass device 300 so as to increase the light amount passing through the left or right filter 311, 312 from the response completion time of the liquid crystal layer of the liquid crystal panel 231 in the area D1 to the response completion time of the liquid crystal layer in the area D8. Therefore, the increased light period I is set over the switching time between the L and R periods. The increased light period I starts before the switching time between the L and R periods, and ends after the switching time between the L and R periods. The backlight source 232 is turned on in the first emission period E1 in accordance with the backlight scan described in the fourth embodiment.

The display apparatus 200A in general stands substantially upright. Therefore, the area D1 displaying the upper parts of the images (the left and right images) is usually positioned physically on the upper side. The area D8 displaying the lower parts of the images is often positioned physically on the lower side. At this moment, heat generated as a result of operating the liquid crystal panel 231 and the backlight source 232 is transmitted upward by convection. Thus, the display area located at a higher position in the liquid crystal panel 231 becomes higher temperature. On the other hand, the display area located at a lower position in the liquid crystal panel 231 becomes lower temperature.

As shown in section (C) of FIG. 11, the first controller 250A makes the sub emission duty of the backlight source 232 (the length of the second emission period E2) greater towards the lower radiation areas (i.e., "the sub emission duty in the radiation area L1"<"the sub emission duty in the radiation area L2"< . . . <"the sub emission duty in the radiation area L8"). As a result, the heat generation of the backlight source 232 gradually increases toward the lower radiation areas. As a result, a substantially even temperature distribution may appear on the display area of the liquid crystal panel 231 to achieve little crosstalk in the entire liquid crystal panel 231.

As described above, in the present embodiment, the first controller 250A adjusts the length of the second emission period E2 in each of the radiation areas L1 to L8. Alternatively, the first controller 250A may adjust the luminance of the backlight source 232 in the second emission period E2 for each of the radiation areas L1 to L8. For example, the first controller 250A may control the backlight source 232 so as to obtain a relationship as "the sub luminance in the radiation area L1"<"the sub luminance in the radiation area L2"< . . . <"the sub luminance in the radiation area L8".

As described above, in the present embodiment, the first controller 250A controls the backlight source 232 to obtain a relationship as "the sub emission duty in the radiation area L1"<"the sub emission duty in the radiation area L2"< . . . <"the sub emission duty in the radiation area L8". Alternatively, the first controller 250A may control the backlight source 232 in accordance with temperature distribution characteristics of the display area of the liquid crystal panel 231, which are defined in accordance with the environment where the display apparatus 200A is situated and/or the characteristics of the display apparatus 200A. For instance, if the display apparatus 200A is characterized in having a middle part in the display area of the liquid crystal panel 231 that becomes warm easily, the first controller 250A may control the backlight source 232 to warm up areas near the periphery of the liquid crystal panel 231.

The temperature detector 233 may detect a temperature in a part of the liquid crystal panel 231. Alternatively, the temperature detector 233 may detect temperatures in the areas D1 to D8 of the liquid crystal panel 231 or a temperature of a part of each area. The first controller 250A may adjust the sub emission duties (the lengths of the second light emission period E2) or the luminance of the radiation areas L1 to L8 in the second light emission period E2 in response to the temperatures detected in the areas D1 to D8. A preferable uniform temperature distribution may appear on the liquid crystal panel 231 to cause little local crosstalk under such control.

It is preferred that the first controller 250A may adjust one of the parameters such as the length of the second emission period E2 of each radiation areas L1 to L8 or the luminance of the backlight source 232 in the second emission period E2. Thus, a preferable uniform temperature distribution may appear on the liquid crystal panel 231 to achieve little local crosstalk.

Various modifications may be made by those skilled in the art as long as these modifications do not depart from the principles described through the aforementioned embodiments. In addition, combinations of the components described in the various embodiments above are contained within the scope of the above descriptions.

The aforementioned embodiments are exemplary rather than restrictive in all aspects. The scope of the above descriptions is illustrated not by the embodiments described in detail but by the appended claims, and is intended to include the meanings equivalent to the appended claims and all modifications made within the scope.

The aforementioned embodiments mainly include the following configurations. A display apparatus and an image viewing system which have the following configurations may cause less crosstalk between the left and right images.

A display apparatus according to one aspect of the aforementioned embodiments includes: a liquid crystal panel configured to temporally and alternately switch over and display a left image which is viewed with a left eye and a right image which is viewed with a right eye; a liquid crystal driver configured to write an image signal into the liquid crystal panel, the image signal including a left image signal to create the left image and a right image signal to create the right image; a backlight source configured to radiate light to the liquid crystal panel; and a controller configured to control the backlight source so that the backlight source emits the light during first emission periods which are set for a left viewing period while the left image is viewed with the left eye and a right viewing period while the right image is viewed with the right eye, respectively, wherein the controller controls the backlight source so that the backlight source emits the light during a second emission period within a non-viewing period, during which none of the left and right images is viewed, and sets a turn-off period during which the backlight source is turned off between the first and second emission periods.

According to the aforementioned configuration, the liquid crystal panel temporally and alternately switches over and displays the left and right images, which are viewed with the left and right eyes, respectively, in response to the image signal written by the liquid crystal driver. The left image is viewed with the left eye in the left viewing period. The right image is viewed with the right eye in the right viewing period.

As a result, a viewer may create a visual stereoscopic image in the brain. The backlight source radiates the light to the liquid crystal panel under the control of the controller. The first emission periods in which the backlight source emits the light are set in the left and right viewing periods, during which the left and right images are viewed with the left and right eyes, respectively. Therefore, the viewer may preferably view the left and right images in the left and right viewing periods, respectively. The controller further sets the second emission period, during which the backlight source emits the light, within the non-viewing period in which none of the left and right images is viewed. The turn-off period in which the backlight source is turned off is set between the first and second emission periods, so that the backlight source preferably consumes less power and moderates a temperature drop of the backlight source. The moderation of the temperature drop of the backlight source results in preferable moderation of a decrease in response speed of the liquid crystal panel. Consequently, the crosstalk between the left and right images is less likely to occur.

In the aforementioned configuration, it is preferred that the display apparatus further includes a temperature detector configured to detect a temperature of the liquid crystal panel, wherein the controller adjusts a length of the second emission period in response to the temperature of the liquid crystal panel.

According to the aforementioned configuration, the temperature detector detects the temperature of the liquid crystal panel. The controller adjusts the length of the second emission period in response to the temperature of the liquid crystal panel, so that the temperature of the backlight source is appropriately controlled. Therefore, the crosstalk between the left and right images is less likely to occur.

In the aforementioned configuration, it is preferred that the display apparatus further includes a temperature detector configured to detect a temperature of the liquid crystal panel, wherein the controller adjusts a luminance of the backlight source in the second emission period in response to the temperature of the liquid crystal panel.

According to the aforementioned configuration, the temperature detector detects the temperature of the liquid crystal panel. The controller adjusts the luminance of the backlight source in the second emission period in response to the temperature of the liquid crystal panel, so that the temperature of the backlight source is appropriately controlled. Therefore, the crosstalk between the left and right images is less likely to occur.

In the aforementioned configuration, it is preferred that the backlight source includes a first radiation area and a second radiation area which radiate the light to different areas on the liquid crystal panel from each other, and the controller independently controls a length of the second emission period in the first radiation area and a length of the second emission period in the second radiation area.

According to the aforementioned configuration, the backlight source includes the first and second radiation areas. The first and second radiation areas radiate the light to the different areas on the liquid crystal panel from each other. The controller independently controls the length of the second emission period in the first radiation area and the length of the second emission period in the second radiation area, so that the length of the second emission period are controlled in response to a change in temperature of the liquid crystal panel. Therefore, the crosstalk between the left and right images is less likely to occur.

In the aforementioned configuration, it is preferred that the backlight source includes a first radiation area and a second radiation area which radiate the light to different area on the liquid crystal panel from each other, and the controller independently controls a luminance of the first radiation area and a luminance of the second radiation area.

According to the aforementioned configuration, the backlight source includes the first and second radiation areas. The first and second radiation areas radiate the light to the different areas on the liquid crystal panel from each other. The controller independently controls the luminance of the first and second radiation areas, so that the luminance is controlled in response to a change in temperature of the liquid crystal panel. Therefore, the crosstalk between the left and right images is less likely to occur.

In the aforementioned configuration, it is preferred that the liquid crystal panel includes a first display area to which the first radiation area radiates the light, and a second display area to which the second radiation area radiates the light, the temperature detector detects temperatures of the first and second display areas, the controller makes the second emission period of the first radiation area longer than the second emission period of the second radiation area if the temperature of the first display area is lower than the temperature of the second display area, and the controller makes the second emission period of the second radiation area longer than the second emission period of the first radiation area if the temperature of the second display area is lower than the temperature of the first display area.

According to the aforementioned configuration, the temperature detector detects the temperature of the first display area to which the first radiation area radiates the light, and the temperature of the second display area to which the second radiation area radiates the light. If the temperature of the first display area is lower than the temperature of the second display area, the controller makes the second emission period of the first radiation area longer than the second emission period of the second radiation area. If the temperature of the second display area is lower than the temperature of the first display area, the controller makes the second emission period of the second radiation area longer than the second emission period of the first radiation area. Therefore, if there is a temperature drop of a certain area, the temperature may be appropriately increased. Accordingly, the crosstalk between the left and right images is less likely to occur. The backlight source may consume less power because the second emission period is not unnecessarily elongated.

In the aforementioned configuration, it is preferred that the liquid crystal panel includes the liquid crystal panel includes a first display area to which the first radiation area radiates the light, and a second display area to which the second radiation area radiates the light, the temperature detector detects temperatures of the first and second display areas, the controller makes the luminance of the first radiation area greater than the luminance of the second radiation area if the temperature of the first display area is lower than the temperature of the second display area, and the controller makes the luminance of the second radiation area greater than the luminance of the first radiation area if the temperature of the second display area is lower than the temperature of the first display area.

According to the aforementioned configuration, the temperature detector detects the temperature of the first display area to which the first radiation area radiates the light, and the temperature of the second display area to which the second radiation area radiates the light. If the temperature of the first display area is lower than the temperature of the second display area, the controller makes the luminance of the first radiation area greater than the luminance of the second radiation area. If the temperature of the second display area is lower than the temperature of the first display area, the controller makes the luminance of the second radiation area greater than the luminance of the first radiation area. Accordingly, if there is a temperature drop in a certain area, the temperature may be appropriately increased. Therefore, the crosstalk between the left and right images is less likely to occur. The backlight source may consume less power because the second emission period is not unnecessarily elongated.

In the aforementioned configuration, it is preferred that the first radiation area is situated above the second radiation area, and the controller makes the second emission period of the second radiation area longer than the second emission period of the first radiation area.

According to the aforementioned configuration, the second emission period of the second radiation area, which radiates the light to a lower area, is made longer than the second emission period of the first radiation, which radiates the light to an upper area although the temperature in the lower area generally becomes lower than the temperature in the upper area because of heat convection. Therefore, even if there is a temperature drop in a certain area, the temperature may be appropriately increased. Accordingly, the crosstalk between the left and right images and the right image is less likely to occur. The backlight source may consume less power because the second emission period is not unnecessarily elongated.

In the aforementioned configuration, it is preferred that the first radiation area is situated above the second radiation area, and the controller makes the luminance of the second radiation area greater than the luminance of the first radiation area.

According to the aforementioned configuration, the luminance of the second radiation area, which radiates the light to a lower area, is made greater than the luminance of the first radiation, which radiates the light to an upper area, although the temperature in the lower area generally becomes lower than the temperature in the upper area because of heat convection. Therefore, even if there is a temperature drop in a certain area, the temperature may be appropriately increased. Accordingly, the crosstalk between the left and right images is less likely to occur. The backlight source may consume less power because the second emission period is not unnecessarily elongated.

In the aforementioned configuration, it is preferred that the first and second display areas are divided in a sub-scanning direction in which the image signal is written by the liquid crystal driver, and the controller sets the first emission period so that the first radiation area emits the light in synchronization with writing of the image signal into the first display area and so that the second radiation area emits the light in synchronization with writing of the image signal into the second display area.

According to the aforementioned configuration, the first and second display areas are divided in the sub-scanning direction in which the image signal is written by the liquid crystal driver. Because the controller sets the first emission period so that the first radiation area emits the light in synchronization with writing of the image signal into the first display area and so that the second radiation area emits the light in synchronization with writing of the image signal into the second display area, the first emission period may become long. Therefore, the viewer may view a bright image.

In the aforementioned configuration, it is preferred that the controller controls an eyeglass device which includes a left filter configured to adjust a light amount reaching the left eye and a right filter configured to adjust a light amount reaching the right eye, the left filter increases the light amount reaching the left eye in the left viewing period under control of the controller, and the right filter increases the light amount reaching the right eye in the right viewing period under the control of the controller.

According to the aforementioned configuration, the controller controls the eyeglass device, which includes the left filter configured to adjust the light amount reaching the left eye and the right filter configured to adjust the light amount reaching the right eye. The controller increases the light amount reaching the left eye in the left viewing period and the light amount reaching the right eye in the right viewing period. Therefore, the viewer may view the left image with the left eye in the left viewing period and the right image with the right eye in the right viewing period.

An image viewing system according to another aspect of the aforementioned embodiments includes: a display apparatus configured to temporally switch over and display a left image and a right image; and an eyeglass device which includes a left filter configured to adjust a light amount reaching the left eye and a right filter configured to adjust a light amount reaching the right eye, wherein the display apparatus includes: a liquid crystal panel configured to temporally and alternately switch over and display the left and right images; a liquid crystal driver configured to write an image signal into the liquid crystal panel, the image signal including a left image signal to create the left image and a right image signal to create the right image; a backlight source configured to radiate light to the liquid crystal panel; and a controller configured to control the backlight source so that the backlight source emits the light during first emission periods which are set for a left viewing period while the left image is viewed with the left eye and a right viewing period while the right image is viewed with the right eye, respectively; and wherein the left filter increases the light amount reaching the left eye in the left viewing period under control of the controller, the right filter increases the light amount reaching the right eye in the right viewing period under the control of the controller, and the controller controls the backlight source so that the backlight source emits the light during a second emission period within a non-viewing period, during which none of the left and right images is viewed, and sets a turn-off period during which the backlight source is turned off between the first and second emission periods.

According to the aforementioned configuration, the liquid crystal panel temporally and alternately switches over and displays the left and right images, which are viewed with the left and right eyes, respectively, in response to the image signal written by the liquid crystal driver. The left filter of the eyeglass device increases the light amount reaching the left eye in the left viewing period. Therefore, the viewer may view the left image with the left eye in the left viewing period. The right filter of the eyeglass device increases the light amount reaching the right eye in the right viewing period. Therefore, the viewer may view the right image with the right eye in the right viewing period. As a result, the viewer may create a visual stereoscopic image in the brain. The backlight source radiates the light to the liquid crystal panel under the control of the controller. The first emission period, in which the backlight source emits the light, is set in the left and right viewing periods, respectively, so that the viewer may preferably view the left and right images in the left and right viewing periods, respectively. The controller also sets the second emission period for the backlight source to emit the light within the non-viewing period, during which none of the left and right images is viewed, so as to intermittently arrange the first and second emission periods. Thus, the backlight source consumes less power and moderates a temperature drop of the backlight source. The moderation of the temperature drop of the backlight source results in preferable moderation of a decrease in response speed of the liquid crystal panel. Thus, the crosstalk between the left and right images is less likely to occur.

INDUSTRIAL APPLICABILITY

The principles of the embodiments are preferably applied to a display apparatus and an image viewing system configured to reduce the crosstalk.

The invention claimed is:

1. A display apparatus, comprising:
a liquid crystal panel configured to temporally and alternately switch over and display a left image which is viewed with a left eye and a right image which is viewed with a right eye;
a liquid crystal driver configured to write an image signal into the liquid crystal panel, the image signal including a left image signal to create the left image and a right image signal to create the right image;
a backlight source configured to radiate light to the liquid crystal panel;
a temperature detector configured to detect a temperature of the liquid crystal panel; and
a controller configured to control the backlight source so that the backlight source emits the light during first emission periods which are set for a left viewing period while the left image is viewed with the left eye and a right viewing period while the right image is viewed with the right eye, respectively, the controller controlling the backlight source so that the backlight source emits the light during a second emission period within a non-viewing period, during which none of the left and right images is viewed, the controller setting a turn-off period during which the backlight source is turned off between the first and second emission periods, wherein
the backlight source includes a first radiation area and a second radiation area which radiate the light to different areas on the liquid crystal panel from each other,
the liquid crystal panel includes a first display area to which the first radiation area radiates the light, and a second display area to which the second radiation area radiates the light,
the controller independently controls: a length of the second emission period in the first radiation area, a length of the second emission period in the second radiation area, a luminance of the first display area, and a luminance of the second display area,
the controller executes one of controls:
a) to make the second emission period of the first radiation area longer than the second emission period of the second radiation area if a temperature of the first display area is lower than a temperature of the second display area,
b) to make the luminance of the first radiation area greater than the luminance of the second radiation area if the temperature of the first display area is lower than the temperature of the second display area,
c) to make the second emission period of the second radiation area longer than the second emission period of the first radiation area if the temperature of the second display area is lower than the temperature of the first display area,
d) to make the luminance of the second radiation area greater than the luminance of the first radiation area if the temperature of the second display area is lower than the temperature of the first display area.

2. The display apparatus according to claim 1, wherein the first radiation area is situated above the second radiation area.

* * * * *